(12) United States Patent
Hollis et al.

(10) Patent No.: US 6,959,393 B2
(45) Date of Patent: Oct. 25, 2005

(54) SYSTEM AND METHOD FOR SECURE MESSAGE-ORIENTED NETWORK COMMUNICATIONS

(75) Inventors: Robert L. Hollis, San Antonio, TX (US); R. Gunnar Engelbach, San Antonio, TX (US); Randal S. Taylor, San Antonio, TX (US)

(73) Assignee: Threat Guard, Inc., San Antonio, TX (US)

( * ) Notice: Subject to any disclaimer, the term of this patent is extended or adjusted under 35 U.S.C. 154(b) by 0 days.

(21) Appl. No.: 10/249,668

(22) Filed: Apr. 29, 2003

(65) Prior Publication Data

US 2003/0202663 A1 Oct. 30, 2003

Related U.S. Application Data

(60) Provisional application No. 60/376,521, filed on Apr. 30, 2002.

(51) Int. Cl.$^7$ ............................................... G06F 11/30
(52) U.S. Cl. ........................ 713/201; 709/223; 709/227
(58) Field of Search .............................. 713/201, 150, 713/160, 200; 709/223, 227; 380/247

(56) References Cited

U.S. PATENT DOCUMENTS

| | | | | |
|---|---|---|---|---|
| 5,761,306 A | * | 6/1998 | Lewis | ........................ 380/282 |
| 6,111,881 A | * | 8/2000 | Soncodi | .................. 370/395.32 |
| 6,167,521 A | * | 12/2000 | Smith et al. | ................. 713/200 |
| 6,415,323 B1 | * | 7/2002 | McCanne et al. | ........... 709/225 |
| 2002/0147771 A1 | * | 10/2002 | Traversat et al. | ........... 709/203 |

* cited by examiner

Primary Examiner—Gilberto Barrón, Jr.
Assistant Examiner—Grigory Gurshman
(74) Attorney, Agent, or Firm—Taylor Russell & Russell, P.C.

(57) ABSTRACT

The present invention provides a message-oriented middleware solution for securely transmitting messages and files across public networks unencumbered by intervening network barriers implemented as security measures. It also provides a dynamic, dedicated, application level VPN solution that is facilitated by the message-oriented middleware. Standard encryption algorithms are used to minimize the threat of eavesdropping and an Open-Pull Protocol (OPP) that allows target nodes to pull and verify the credentials of requestors prior to the passing of any data. Messaging can be segregated into multiple and distinct missions that all share the same nodes. The security network's architecture is built to resist and automatically recover from poor, slow, and degrading communications channels. Peers are identifiable by hardware appliance, software agent, and personally identifiable sessions. The security network provides a dynamic, private transport for sensitive data over existing non-secure networks without the overhead and limited security associated with traditional VPN solutions.

28 Claims, 17 Drawing Sheets

SYSTEM AND METHOD FOR SECURE MESSAGE-ORIENTED NETWORK COMMUNICATIONS

CROSS REFERENCE TO RELATED APPLICATIONS

This application claims benefit of U.S. Provisional Application No. 60/376,521, filed on Apr. 30, 2002.

BACKGROUND OF INVENTION

The invention relates generally to network security, and more specifically to secure message and file transfers across public networks without being encumbered by firewalls and other network barriers. It uses standard encryption algorithms to minimize the threat of unauthorized file and message access, and an open-pull protocol that allows target network nodes to pull and verify the credentials of a requestor prior to the passing of any data.

The need for providing and accessing information throughout small and large enterprise organizations spawned rapid a growth in intranets and extranets to satisfy these organizational communications requirements. With the rapid growth of the Internet as a public network communication medium, organizations found substantial cost savings by using the Internet as an worldwide vehicle for providing and accessing organizational information. The result was a shift from closed and protected to open and less secure, open information infrastructure. Gateways were provided to connect existing private networks to the Internet to replace many private dedicated networks providing access to disparate parts of the world. It is not unusual in today's business environment to have multiple computer workstations and servers interconnected by complex and widely dispersed communications networks. These communications networks are critical to many businesses that rely on these information networks to provide services for the day-to-day operation of their enterprises.

With the growth of these communications networks came an increase in incidences of unauthorized access to these networks by individuals and software programs for accessing confidential information and causing disruptions or irreparable harm to these informational networks. These intrusions, oftentimes resulting in economic losses, have created a demand for means for detecting and preventing malicious and unauthorized access to these networks by users and organizations that seek-to find and exploit the smallest security hole. In addition to enterprises instituting safeguards to prevent harm caused to business enterprises and individuals, the government has instituted regulations to protect the privacy of information on individuals that may be available on these information networks.

The Gramm-Leach-Bliley Act requires financial institutions and financial services companies to comply with stringent privacy and security standards. The health care market has similar legislation called the Health Insurance Portability and Accountability Act (HIPAA). While the details of HIPAA are still being completed, it will clearly establish uniform information security standards for health care organizations. Since the late 1980s, the government agencies have been under legislative pressure to secure networked systems. Emerging homeland defense initiatives will add additional and enforceable network security requirements to the government agencies.

In response to unauthorized intrusions into informational networks, various protective measures have been implemented to eliminate or reduce intrusion incidences. Some of these measures include Public Key Infrastructure (PKI) encryption, S/MIME Email security, Secure Sockets Layer (SSL) 128 bit encryption, Virtual Private Network (VPN), firewalls, and vulnerability scanners. Some of these network protection schemes may work at cross-purposes to one another by inhibiting other protection schemes from operating effectively. For example, a firewall may inhibit a vulnerability scanner form assessing the intrusion vulnerability of a system protected by the firewall.

Network vulnerability scanners have been used to perform network vulnerability evaluations by scanning network nodes for detection of open ports and vulnerabilities to unauthorized access. Since much of the data collected by network scanners is considered to be confidential, a secure means is required for transmitting the collected data over the network. These scanners need to do more than send and receive data over a network. They must also offer network services that facilitate receiving and transmitting remote commands to nodes within a network that are unencumbered by intervening network barriers. An embodiment of a network vulnerability scanner that satisfies these requirements is disclosed in U.S. Provisional Application No. 60/376,489, filed on Apr. 30, 2002, and incorporated herein by reference. However, the solution to this requirement lends itself to solutions of other problem sets. It is also desirable that the solution provides network support for multiple missions of multiple clients and related subgroups.

SUMMARY OF INVENTION

The present invention provides a message-oriented middleware solution for securely transmitting messages and files across public networks unencumbered by intervening network barriers implemented as security measures. It uses standard encryption algorithms to minimize the threat of eavesdropping and an Open-Pull Protocol (OPP) that allows target nodes to pull and verify the credentials of the requestor prior to the passing of any data. Messaging can be segregated into multiple and distinct missions that all share the same nodes. These missions support hierarchical groups for private interactive and broadcast communications. The security network's architecture is built to resist and automatically recover from poor, slow, and degrading communications channels. When necessary, it can automatically choose alternative methods of communication for recovery, reconfiguration, or system upgrades. Its core software can run on various platforms, including those running Linux, Sun Solaris, Microsoft Windows variants, and Unix operating systems, as well as wireless devices. Peers can be identifiable by hardware appliance, software agent, and personally identifiable sessions. Furthermore, the peers of the network can offer services to any other peer, regardless of intervening network barriers, relying upon-the security network to facilitate and control access to that service. The security network provides a dynamic, private transport for sensitive data over existing non-secure networks without the overhead and limited security associated with traditional VPN solutions.

The present invention may be viewed as a publish-subscribe network of peers. Peers can communicate with each other through Rendezvous Peers (RVPs) using Key Authorities (KA's) as validation instruments. All nodes of a network tie into the security network by making an OPP (Open-Pull Protocol) connection to a single RVP. Part of the OPP sequence involves the connection requestor providing its KA for validation of connection rights, ensuring participation by only authorized end-points. Once connected, a node can communicate with any other node, provided that Public Keys have been properly exchanged. The KA's facilitate this key exchange and can do so automatically, or with a forced manual approval per request.

Once the OPP connection has been accepted, the connecting node subscribes to channels on the RVP. All messages are passed via discreet or broadcast channels. Upon receipt of a message, an RVP asks other RVPs if they have a subscriber to the channel of the message. Responding RVPs receive the message, making it available for their individual subscribers. To expedite this process over time, subscription responses are cached on the RVP, negating the need for the request to be made on every message. This implies, however, that subscriptions expire and need to be renewed on a regular basis.

An additional and unique ability of this message-oriented middleware is secure global enterprise service extensions. For example, a research institution can offer access to a centralized research database to key individuals, and those individuals can access that database from anywhere in the world, using any application and any operating system. To set this up, a user negotiates a key exchange with the appropriate Security Access Gateway (SAG), where the KA has permit/veto power. The key exchange protocol for a service request includes the passing of the hash of the executable the user wants to use. The security network application on the user's workstation encrypts all transmissions to the SAG, where the hash is used as a signature to validate the transmission. Therefore, the authorized user can only use the pre-coordinated application. TCP/IP access is gained by opening a random ephemeral forwarded port on the SAG's RVP. Part of the negotiation includes setting access controls on that forward port, allowing only the user's workstation to access the resource. In this manner, an authorized user with Internet access can use any network aware application to connect to otherwise restricted resources.

Pushing the above case to a logical conclusion, one can see that the aforementioned client-server interchange is really two peers of a network communicating securely. So, if two computers, whether they be workstations, servers, or Pocket PCs, wish to exchange information, the security network can be used to facilitate the authentication of the initial connection and establish the secure communications channel over which the two peers talk. This can be used for peer-to-peer solutions such as voice or video over IP and for direct sharing of confidential information, regardless of network barriers or source & destination platforms.

Every message that is sent through the security network is signed by the sender, and each message header includes a field indicating the originator of the message. If a message does not have a signature, or if the signature does not match the Public Key of the sender, the recipient ignores the message. This implies that a message recipient must know the Public Key of any message originator in order to process a message from that node. Every node in the security network architecture has the same internal message handling components, including a Message Warehouse Listener, Message Warehouse, Message Warehouse Manager, Subscription Manager, Subscription Cache, Relay Queue, Relay Gun, Router Daemon, Routing Queue, RVP Gun, Signature Checker, Cryptor, RVP Cache, RVP Cache Manager, Public Key storage, Key Manager, and one or more Secondary Communications Gateways. All incoming messages are received by the Message Warehouse Manager and placed in the node's internal Message Warehouse. FIG. 1 illustrates the functionality of a Security Network Transport Layer (SNTL). The Message Warehouse Manager facilitates coordinated retrieval of the messages from the Warehouse. The Routing Queue Daemon prepares messages for delivery to other interested RVPs on the network. The Subscription Manager processes subscription requests and updates the Subscription List; it also processes messages that match stored subscription requests and makes them available for delivery through the SNTL. Finally, local applications process messages that are intended for their interest. If a process receives a message when it's not running, the Application Daemon (if so configured) starts that application automatically.

An embodiment of the present invention is a method for secure message-oriented communications between nodes in a network, comprising the steps of deploying at least one key authority within the network, deploying a plurality of rendezvous peers in the network having a plurality of nodes, establishing an open pull protocol connection between each node of the network and a single rendezvous peer, and exchanging messages between the nodes of the network via rendezvous peers using public key infrastructure techniques. The step of deploying at least one key authority may comprise generating a set of public-private key pairs and a uniform resource identifier, associating the generated public-private key pair and uniform resource identifier with the at least one key authority, notifying all other known key authorities in the network about the network introduction of the at least one key authority, including the associated public-private key pair and the uniform resource identifier, and initializing the at least one key authority and making a persistent tunnel connection to all rendezvous peers in the network from the at least one rendezvous peer. The step of generating and associating the public-private key may be performed manually by a user. The step of generating and associating the public-private key may be performed automatically by another existing key authority. The method may further comprise enabling an automatic exchange of public keys using an auto reciprocate feature. The persistent tunnel connection requested by a public network user node may be established by a key authority and a secure access gateway on the protected side of a firewall. The key authorities may limit user access to approved applications. The step of deploying a plurality of rendezvous peers in the network may comprise for each deploying rendezvous peer, generating and associating a uniform resource identifier, an IP address, and a list of other rendezvous peers to be used a cross-geographic message gateways, by a nearest key authority in the network, notifying all known key authorities in the network about the network introduction of the each deploying rendezvous peer, including the associated IP address and the uniform resource identifier, and initializing each deploying rendezvous peer and making a persistent tunnel connection between each rendezvous peer and a nearest key authority in the network. The step of establishing an open pull protocol connection between each node of the network and a single rendezvous peer may comprise manually updating a key authority with each associated node public key and fully qualified identification, installing an initial configuration on each node including credentials of a fully qualified uniform resource identifier, a public key, a private key, an associated key authority identification, the public key of the associated key authority, an associated upline network vulnerability scanner, a list of known rendezvous peers, and a list of subscriptions, initializing each node of the network, determining a best rendezvous peer to associate with each node from a list of known rendezvous peers, making a connection between each node and the associated best rendezvous peer and upline network vulnerability scanner, providing credentials of each node to its associated rendezvous peer, validating a key authority associated with each node, whereby the key authority associated with each node is the same as that of the node's associated rendezvous peer, providing a two way messaging gateway by the associated rendezvous peer of each node, and requesting an update by each rendezvous peer from its associated key authority. The step of exchanging messages between the nodes of the network may comprise granting access to a first user from a second user by the first user associated key authority, making an open pull protocol connection by the first user to the first user associated rendezvous peer, making an open pull protocol connection by the second user to the second user associated rendezvous peer, requesting and receiving the first user public key by the second user, encrypting and sending a message by the second to the first user via the second user associated rendezvous peer, receiving the message by the first user associated rendezvous peer, and forwarding the message to the first user by the first user associated rendezvous peer. The step of exchanging messages between the nodes of the network may further include exchanging messages via a secure channel, comprising making a open pull protocol connection to a first user associated rendezvous peer by a first user, sending a connection request for a second user to a second user associated key authority by the first user, verifying the credentials of the first user by the second user associated key authority, sending a message to a second user by the second user associated key authority to open a listener for the first user with first user's public key, sending a message to a second user associated rendezvous peer to open a tunneled port to the second user, confirming an open tunneled port to the second user associated key authority, sending notification of a forwarded service offering to first user, including IP address port number opened, and authentication token, starting an internal listener on a loop back interface and a user application by the first user, connecting the user application to the second user associated rendezvous peer, and transferring encrypted network traffic through the established secure channel between the first user application and the second user. The step of exchanging messages between the nodes of the network may be selected from the group consisting of exchanging messages between a node and users, exchanging messages between a node and network scanners, exchanging messages between a node and rendezvous clients, exchanging messages between a node and key authorities, exchanging messages between a node and access gateways, and exchanging messages between a node and message consolidators. The step of exchanging messages between the nodes of the network may be selected from the group consisting of exchanging messages over a non-secure message channel and exchanging messages over a secure message channel. The method may further comprise establishing subscriptions for specifying how matching messages are transported to requesting network nodes. Each subscription may be selected from the group consisting of volatile subscriptions, permanent subscriptions, and fallback subscriptions. A computer-readable medium may contain instructions for controlling a network to implement the method described above.

Another embodiment of the present invention is a system for secure message-oriented communications between nodes in a network, comprising means for deploying at least one key authority within the network, means for deploying a plurality of rendezvous peers in the network having a plurality of nodes, means for establishing an open pull protocol connection between each node of the network and a single rendezvous peer, and means for exchanging messages between the nodes of the network via rendezvous peers using public key infrastructure techniques. The means for establishing an open pull protocol connection and the means for exchanging messages between the nodes may comprise a security network transport layer comprising a Message Warehouse Listener, Message Warehouse, Message Warehouse Manager, Subscription Manager, Subscription Cache, Relay Queue, Relay Gun, Router Daemon, Routing Queue, RVP Gun, Signature Checker, Cryptor, RVP Cache, RVP Cache Manager, Public Key storage, Key Manager, and one or more Secondary Communications Gateways. Each node in the network may include a security network transport layer for establishing an open pull protocol connection and exchanging messages between the nodes. Each network node may be selected from the group consisting of a user, a network vulnerability scanner, a rendezvous peer, a security access gateway, a threat receiver, a master consolidator, and a key authority. The system may include firewalls and cross-geographic gateways.

Yet another embodiment of the present invention is a method for secure message-oriented communications between nodes in a network, comprising establishing a publish-subscribe network of peer nodes, communicating between peer nodes using key authorities as validation instruments, securely connecting all nodes of the network using open pull protocol connections to connect each node of the network to a single rendezvous peer, providing a key authority of a requestor node for validation of connection rights, and when validated, enabling secure communication of messages between a node and all other validated nodes of the network provided public keys are properly exchanged. The key authorities may automatically facilitate exchange of public keys. The connected nodes may subscribe to channels on a rendezvous peer. All messages may be passed by either a discrete or broadcast channel. The method may further comprise security access gateways for limiting access to predetermined applications. Each message may include a signature of a sender and each message header may include a field for designating a message originator. The signature must match the public key of the sender for validation.

BRIEF DESCRIPTION OF DRAWINGS

These and other features, aspects and advantages of the present invention will become better understood with regard to the following description, appended claims, and accompanying drawings wherein:

DETAILED DESCRIPTION

Figure 1:
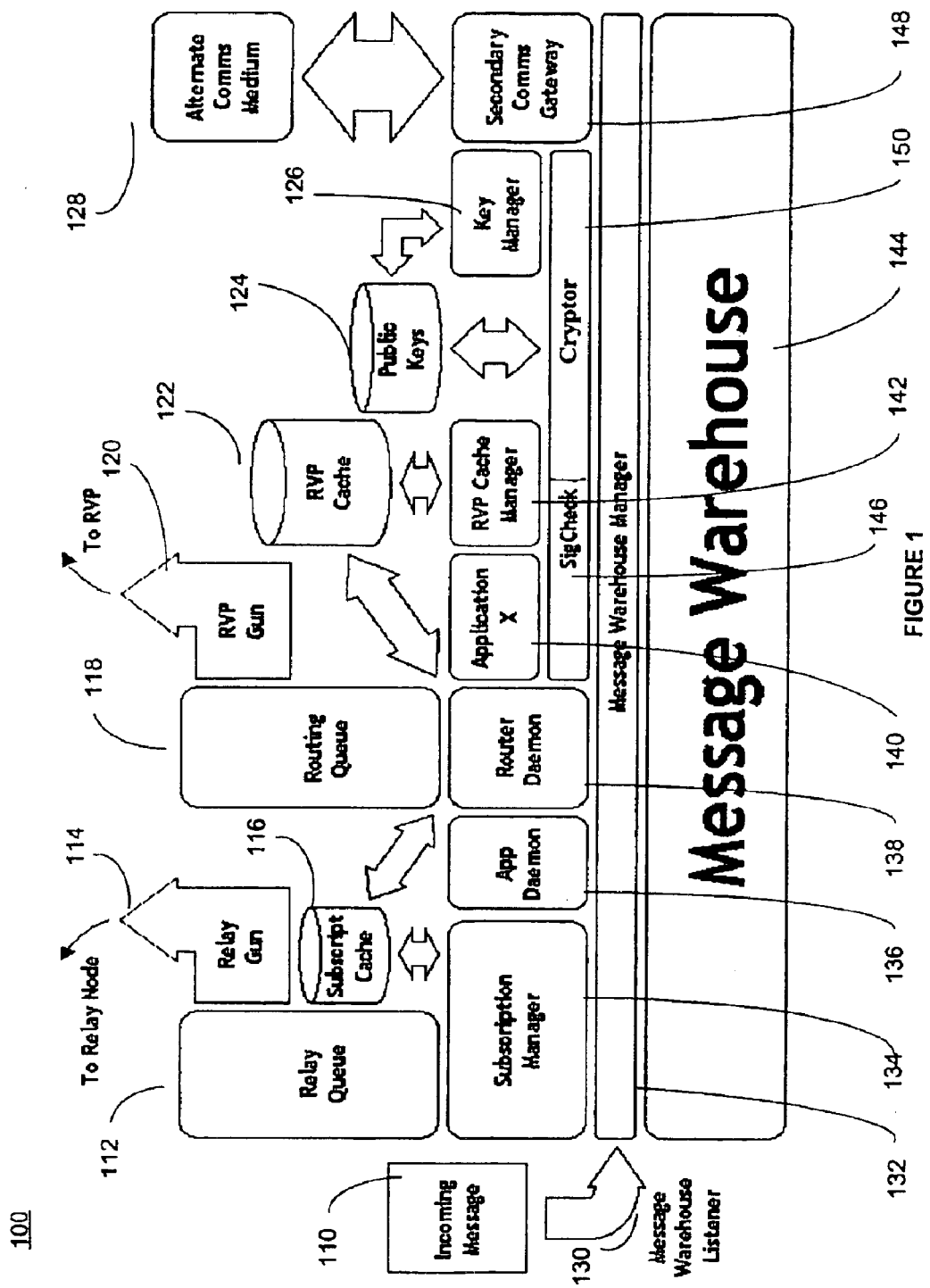
FIG. 1 shows a functional block diagram of the Security Network Transport Layer (SNTL) according to an embodiment of the present invention.

Turning now to FIG. 1, FIG. 1 shows a functional block diagram of the Security Network Transport Layer (SNTL) 100 according to an embodiment of the present invention. The purpose of the SNTL 100 is to establish a two-way communications channel across firewalls for message traffic and forwarded connections. The SNTL 100 provides a medium over which security network nodes behind firewalls can communicate in full duplex with other nodes of the security network. Since firewalls are intended to block in-bound communications to the networks on which network scanners may be deployed, a form of firewall tunneling must be used to enable bi-directional communications. The SNTL 100 is also used to make and control access to forwarded ports that give access to protected resources through firewalls. Opening these services up to the world obviates the need to ensure only an authorized requestor of the services uses the forwarded resource. An SNTL 100 allows bi-directional transmission of messages across firewalls and ensures continued usability of persistent OPP connections. On connection attempts, the SNTL 100 validates the connecting participant before allowing that participant to send and receive messages to and from other nodes of a security network. An SNTL 100 pulls its list of relay nodes from a Rendezvous Peer (RVP) Cache 122. A RVP represents another node of a security network having an embedded SNTL 100. Prior to connection, an SNTL 100 can evaluate and chose the optimal upline relay node.

Prior to describing details of the SNTL, several initial concepts relating to the network operation of the SNTL are examined. These include the use of messages, subscriptions, and keys. The purpose of messages is to encapsulate information for transmission through all communications media employed by security network. Messages are the common communication document for all nodes in the security network architecture. Everything that is transferred through the system, from Subscription Requests to large files, is passed in a message. The message header provides addressing information that enables the security network to deliver it and enables the receiving process to decrypt it. The message also records routing hops to capture historical route information over the life of the message. Message elements include the fields described in Table 1.

TABLE 1

| FIELD | DESCRIPTION | TYPE |
| --- | --- | --- |
| Destination | URI or mask of recipient | Mandatory |
| Destination App | Receiving application | Optional |
| Source | URI of sender | Mandatory |
| Source's KA | Key Authority of sender | Optional |
| Message Type | (see requirements) | Optional |
| Expiration | Specifies lifespan | Mandatory |
| Payload Signature | <ask gun> | Mandatory |
| Flags | <ask gun> | Optional |
| Payload | The stuff being passed | Optional |
| Message Size | Overall size of message | Mandatory |
| RVP Hop History | History of visited RVPs | Living |

Messages are constructed in a language independent, platform independent, universally discernable format having a header for supporting a RVP list for hop history and containing addressing information to the application level. The message header supports system-wide security protocols.

The purpose of subscriptions is to identify which nodes of the security network are interested in messages or message groups as an aid to internal message routing processors in making routing decisions. Several message handling options exist internal to each node, as shown in Table 2.

TABLE 2

| SUBSCRIPTION TYPE | TRANSPORT MEDIUM | MESSAGE DESTINATION |
| --- | --- | --- |
| Volatile | Security Network | Relay Node |
| Permanent | Security Network | Relay Node |
| Permanent | TCP | XMG |
| Permanent | Floppy | Floppy Disk |
| Fallback | Direct from Warehouse | Email, HTTP, etc. |

When a subscription is created, the subscription specifies how matching messages should be transported to the requesting node. Dynamic subscription management makes on-going adjustments to the subscription list to keep valid delivery options, remove ones that are bad, and rotate alternative comm. options. Subscriptions specify a discrete recipient address or a mask of addresses in which the subscribing node is interested, a subscription type, and an expiration time.

A subscription also specifies the transport medium over which matching messages are to be transmitted.

The purpose of keys is to ensure that only intended recipients can read sensitive information, and to validate that a specified sender of a message is the true sender. The Public-Private Key paradigm is a proven security methodology for encrypting transmitted information. Standard algorithms, such as RSA, are used for the implementation of keys. Keys are generated in pairs (public and private), and support a signing process that enables message recipients to verify the sender, based on the sender's Public Key. The public/private keys will be used for encryption, authentication, and key exchange, and the key type chosen must be valid for all three uses.

Returning to FIG. 1, the purpose of the Subscription Cache 116 is to store subscriptions for all routing processes on a node. The Subscription Cache 116 acts as a reference for all routing processes that are involved in getting messages to their ultimate destinations. Table 3 shows some routing processes and their related routing paths.

TABLE 3

| ROUTING PROCESS | DELIVERY FACILITY | CACHE TRIGGER |
| --- | --- | --- |
| Subscription Manager | Relay Gun | Medium = SNTL |
| Router Daemon | RVP Gun | Medium = TCP |
| Application X | Internal | Recipient = local node |
| Secondary Gateway | (determined by gateway) | Medium = <medium of gateway> |

In addition to the fields shown in Table 3, the Subscription Cache 116 records expiration times for volatile subscriptions. Access to this cache must be as fast as possible to keep message traffic flowing through the node quickly. Table 4 shows a recommended field list for the Subscription Cache 116.

TABLE 4

| FIELD | DESCRIPTION | EXAMPLE |
| --- | --- | --- |
| Subscription | Destination or destination mask of interest | world.usa.tg.var1.tb122 world.usa.tg.var1.* |
| Subscriber | Interested party | world.usa.tg.var1.tb121 |
| Medium | Transport facility | TNTL, TCP, Email, local, etc. |
| Expiration | Lifespan of subscription | Mar. 31, 2002 06:02:43 |

The Subscription Cache 116 must support the fastest possible access to potentially thousands of concurrent subscription entries. Volatile subscriptions may be lost due to power outages or system reboots, but Permanent and Fallback subscriptions remain intact.

Considering the Rendezvous Peer (RVP) Cache 122, the purpose of the RVP Cache 122 is to hold a list of usable RVPs to choose from in making an Open Pull Protocol (OPP) connection. At the beginning of any OPP connection, the connecting node assesses its connection options by determining which RVP would be optimal. In the simplest case, this would be the closest RVP in terms of network topology. A more sophisticated algorithm may also consider the current load and current subscription list of available RVPs. Regardless of the algorithm, the node needs to know which RVPs are available to insert into the decision making process. The RVP Cache 122 provides those entries. The RVP list in the RVP Cache 122 provides the fully qualified Uniform Resource Identifier (URI) and an Internet Protocol (IP) address of each RVP listed. The RVP list is loaded from a non-volatile storage resource on the node, and must be updateable at runtime, but only with updates sent from the node's Key Authority (KA).

Considering the Public Key Database 124, the purpose of the Public Key Database 124 is to store Public Keys of interest as well as the node's Private Key. There are certain keys each node needs at startup, its own Private Key and its KA's Public Key. These data points can be used to gain all other Public Keys in security network, provided the proper authorizations are made. When a Public Key is learned through the network, the node caches that key in this Public Key Database 124 such that future communications with the same node do not have to incur the expense of key discovery. The Public Key Database 124 must have the node's Private Key and the KA's Public Key loaded at boot time, and it also stores keys by fully qualified URI. Invalid keys are removed automatically, while the database must accept injection of new keys on a regular basis.

Considering the Message Warehouse 144, the purpose of the Message Warehouse 144 is to store messages while they are routed to relevant modules within the SNTL 100. The Message Warehouse 144 provides a simple repository of messages. As messages are produced by a node, or routed to a node, these messages get stored in the Message Warehouse 144, allowing interested applications and routers to read or pull these messages and deliver them to their ultimate destinations. The Message Warehouse 144 supports two sizes of messages. Small messages (generally control messages or small files) can and should be stored in memory. Large messages (as determined by a configuration setting) are typically file transfers. Such files may need to be stored on the file system to keep them from being unwieldy in the internal routing process. In addition to the primary storage facility, the Message Warehouse 144 needs to accommodate a holding area for locally terminated messages with key problems. A signature, for providing a validation of a message's sender, may not obtain authorization for three reasons: 1) the sender's Public Key may not be listed in the local Public Keys Database 124, 2) the local Public Keys Database 124 has the wrong Public Key (perhaps due to re-keying of the sender), or 3) the sender's Public Key is incorrect. The Message Warehouse Annexes, the "Pending Annex" and the "Jail Annex", handle these scenarios. The "Pending Annex" is used to store messages for which there is no matching Public Key. A procedure, SigCheck, recognizes the discrepancy and injects the message into the "Pending Annex" through the Message Warehouse Manager 132. SigCheck then initiates a Key Discovery Protocol by requesting a specified key from the KA. The KA eventually responds with a Key Update message that is handled by the Key Manager 126. When a new key is added, it notifies the Message Warehouse Manager 132, which then sifts through the "Pending Annex" and notifies processes of any matching messages. The "Jail Annex" is used when a message expires in the "Pending Annex". The "Jail Annex" is more of a log than a storage facility. Certain elements of the message header are stored for future reference of the demise of the message and the time of infraction. The Message Warehouse Manager 132 handles Pending-to-Jail management. The Message Warehouse 144 stores messages for interested applications and routing processors. A configuration setting determines the size threshold for a message to be classified as small. Small messages are stored in memory for quick access and processing, while large messages are stored in memory, except the payload. The payload section of large messages specifies the file system location of the entire message. Messages with Key issues are stored in the Pending Annex, and message header elements of messages with key violations are stored in the Jail Annex. These header elements include: Message ID, Sender, Sending App, Recipient, Receiving App, Message Type, and time of expiration.

Considering the Message Warehouse Manager 132, the purpose of the Message Warehouse Manager 132 is to facilitate the injection and removal of messages to and from the Message Warehouse 144. The Message Warehouse Manager 132 conceptually sits on top of the Message Warehouse 144, acting as a gatekeeper. Incoming messages 110 from other nodes are injected through the manager, new messages created by local applications are submitted through the manager, and anyone interested in retrieving a message requests it from the manager. As the ultimate controller of the message store, the Message Warehouse Manager 132 can minimize read/write contentions. It serves the separate inherent task of notifying local processes of the introduction of a new message. When a new incoming message 130 is injected through the listener or from a local application, the Message Warehouse Manager 132 lets all local processes know that the message is available. Likewise, when a new subscription is added to a Subscription Cache 116, the Message Warehouse Manager 132 re-notifies the applications about messages that meet the new criteria. Furthermore, the Message Warehouse Manager 132 need only alert processes that have not already taken action on the message so they are not encouraged to process the same message twice. The Message Warehouse Manager 132 listens for new incoming messages 110 from a Message Warehouse Listener 130, and accepts new messages as generated from local applications. It notifies all local applications of the injection of new messages from other nodes and from local applications, and keeps track of which applications have processed each message until that message has been removed from the Message Warehouse 144. The Message Warehouse Manager 132 sends a last-chance notification of warehoused messages to applications that have not yet processed each message prior to removing that message due to expiration. It also removes discretely addressed messages from the warehouse on their first read (these messages have only one place to go, and only one way to get there). The Message Warehouse Manager 132 accepts new subscription notifications from the Subscription Manager, and as new subscriptions are acknowledged, the Message Warehouse Manager 132 must create a list of warehoused messages that fit the new subscription and notifies all applications that have not yet processed each message as if the message was newly injected into the warehouse. The Message Warehouse Manager 132 must note an expiration time of each message, and remove each message as its expiration time passes, as well as send an "Undeliverable" message to the sender if a discretely address message expires in the Message Warehouse 144. It accepts messages with Key issues from SigCheck, and responds by placing the message in the Pending Annex. When a new Public Key is injected into the Key Database, the Message Warehouse Manager 132 accepts notification from the Key Manager 126 and reacts by notifying local applications of any message in the Pending Annex that matches the key. If the wait time for a message in the Pending Annex is exceeded, the Message Warehouse Manager 132 saves header elements of the message in the Jail Annex and removes the message from the Pending Annex. These header elements include: Message ID, Sender, Sending App, Recipient, Receiving App, Message Type, and time of expiration.

Considering the Message Warehouse Listener 130, the purpose of the Message Warehouse Listener 130 is to receive incoming messages 110 from RVPs and Relay Nodes, and to inject those messages into the Message Warehouse 144 via the Message Warehouse Manager 132. The Message Warehouse Listener 130 is a listening service that shuttles incoming messages 110 into the Message Warehouse 144 via the Message Warehouse Manager 132. There may be multiple message gateways into and out of a node, but the Message Warehouse Listener 130 concerns itself only with messages 110 that arrive through the security network from either Relay Nodes or RVPs. These transports use one of two streams: TCP/IP or stdin/stdout interfaces of a running process. Messages 110 received over either facility are passed on to the Message Warehouse Manager 132 in the same manner. The Message Warehouse Listener 130 accepts the Message ID and Message Size of incoming messages 110 prior to the transmittal of the complete message 110.

Upon receipt of the Message ID, the Message Warehouse Listener 130 checks for the existence of that message. If it exists, it returns the size of the file. If it does not exist, it returns filesize=0 to the sender. If the incoming message 110 is greater in size than a specified configuration, the Message Warehouse Listener 130 writes the message to a file system rather than store it in memory. In this case, the message's header and file system reference are passed through the system rather than the entire message. Once a message 110 is received in full, the Message Warehouse Listener 130 passes the message 110 on to the Message Warehouse Manager 132.

Considering the Subscription Manager 134, the purpose of the Subscription Manager 134 is to accept new subscriptions into the Subscription Cache 116, to notify the Message Warehouse Manager 132 of said new subscriptions, to populate the Subscription Cache 116 with initial subscriptions on startup, and to remove/rotate subscriptions. The Subscription Manager 134 is responsible for loading the Subscription Cache 116 with static entries that are part of the node's configuration. Fallback subscriptions and Permanent XMG subscriptions fall under this duty. Once the cache is established, the Subscription Manager 134 waits for subscription related messages to be delivered to the node. It injects new subscriptions into the Subscription Cache 116 and notifies the Message Warehouse Manager 132. The Subscription Manager 134 is also responsible for keeping the Subscription Cache 116 updated by removing expired subscriptions and appropriately adjusting subscriptions for which delivery has failed. The Subscription Manager 134 reads subscription information at node startup to load initial subscriptions such as Permanent XMG subscriptions, Fallback subscriptions, and Personal subscriptions (subscriptions for the node itself. It pulls Subscription Request messages out of the Message Warehouse 144 and injects the specified subscription into the Subscription Cache 116. The Subscription Manager 134 also pulls Subscription Inquiry messages out of the Message Warehouse 144, evaluates them against the current Subscription Cache 116, and return a Subscription Inquiry Response to the sender if a matching subscription is found. It also pulls Subscription Inquiry Response messages out of the Message Warehouse 144 and injects the specified subscription into the Subscription Cache 116. When processing a Subscription Request or a Subscription Inquiry Response, the Subscription Manager 134 notifies the Message Warehouse Manager 132 of the new subscription. The Subscription Manager 134 also reads and pulls messages out of the Message Warehouse 144 that are to be sent to Relay Nodes and places them on the Relay Queue 112. It also pulls expired messages from the Relay Queue 112, re-injects them into the Message Warehouse 144, and takes action on the Subscription Cache 116 as described in Table 5 below, as well as accepts notification from the Router Daemon 138 in the event of delivery failures.

Considering the Relay Queue 112, the purpose of the Relay Queue 112 is to hold messages for the Relay Gun 114 until they are successfully delivered or expired. The Relay Queue 112 is a message queuing facility for outgoing messages being sent to a Relay Node. When the Subscription Manager 134 places a message on the Relay Queue 112, the transmission to the next Relay Node is known; no additional address resolution is required. Since the receiving Relay Node may not be available, messages are subject to removal from the Relay Queue 112 by the Subscription Manager 134 if they are not delivered within a configurable amount of time. The Relay Queue 112 holds messages until either the Relay Gun 114 or the Subscription Manager 134 pulls them.

Considering the Relay Gun 114, the purpose of the Relay Gun 114 is to send messages to connected Relay Nodes via a Persistent OPP Connection. The Relay Gun 114 acts as a simple message transmitter that is programmed to use the SNTL. Each remote Relay Node will have a dedicated local system resource that acts as a conduit to that node. If this resource is available and operational, the Relay Gun 114 pulls messages from the Relay Queue 112 and writes them to this resource. The Relay Gun 114 confirms the accessibility of the receiving Relay Node prior to pulling a message off of the Relay Queue 112. It supports the transmission of small messages from memory, and large messages from the file system. The Relay Gun 114 performs an RDX negotiation prior to sending a message to a Relay Node. If a message has been partially received by the Relay Node, the Relay Gun 114 sends only the portion of the file that has not been transmitted successfully. At the completion of the message transmission, the Relay Gun 114 accepts a file size confirmation prior to purging the message from the local system.

Considering the Router Daemon 138, the purpose of the Router Daemon 138 is to read or pull messages out of the Message Warehouse 144 via the Message Warehouse Manager 132 for delivery to other RVPs. Upon receiving notice of available messages in the Message Warehouse 144, the Router Daemon 138 evaluates the destination against the Subscription Cache 116, and forwards messages that are to be sent to other RVPs by placing them on the Routing Queue 118. If an RVP-bound message expires on the Routing Queue 118, the Router Daemon 138 pulls it off the Routing Queue 118, re-injects it into the Message Warehouse 144, and adjusts the subscriptions appropriately. Upon message notification from the Message Warehouse Manager 132, the Router Daemon 138 places that message on the Router Queue 118 if an RVP has a matching subscription. Upon expiration of a message on the Router Queue 118, the Router Daemon 138 pulls expired messages off of the Router Queue 138, re-injects them into the Message Warehouse 144, and takes action on the Subscription Cache 116 as described in Table 5 below.

Considering the Routing Queue 118, the purpose of the Routing Queue 118 is to hold messages for the RVP Gun 120 until they are successfully delivered or expired. The Routing Queue 118 is a message queuing facility for outgoing messages whose next security network destination is an RVP. When the Router Daemon 138 places a message on the Routing Queue 118, this next destination is known, and no additional address resolution is required. Since the receiving RVP may not be available, messages are subject to removal from the Routing Queue 118 by the Router Daemon 138 if they are not delivered within a configurable amount of time. The Routing Queue 118 must hold messages until either the RVP Gun 120 or the Router Daemon 138 pulls them.

Considering the RVP Gun 120, the purpose of the RVP Gun 120 is to send messages to other RVPs via a direct TCP connection. The RVP Gun 120 acts as a simple message transmitter that's programmed to use TCP/IP protocol. Each known RVP will be listed in the RVP Cache 122 along with its Internet routing information. If the RVP is available, the RVP Gun 120 establishes a socket, pulls messages from the Routing Queue 118, and writes them to the socket. The RVP Gun 120 confirms the accessibility of the receiving RVP prior to pulling a message off of the Routing Queue 118. The RVP Gun 120 supports the transmission of small messages from memory, and large messages from the file system. It also performs an RDX negotiation prior to sending a message to a RVP. If a message has been partially received by the RVP, the RVP Gun 120 sends only the portion of the file that has not been transmitted successfully. At the completion of the message transmission, the RVP Gun 120 accepts a file size confirmation prior to purging the message from the local system.

Considering the Application Daemon 136, the purpose of the Application Daemon 136 is to start an application that has messages waiting in the Message Warehouse 144, if that application is not already running. There are several reasons that an application may not be running when the Message Warehouse 144 receives a message for that application. It may be that the application is not yet started, or that the application has halted. In any case, the receiving application needs to be started to process the message. The Application Daemon 136 references an editable list of applications that are subject to automatic restarting, and which identifies applications started on system initiation that are to be running at all times. The Application Daemon 136 keeps watch over all fulltime applications, restarting them if they terminate for any reason, as well as watching the "Recipient:" and "To Application:" field of all incoming messages 110 for messages that are destined for a listed application on the local node. If the Application Daemon 136 receives notification of a message that is destined for a non-instantiated local application, it starts that application and sends it a notification of the triggering message.

Considering the Signature Checker 146, the purpose of the Signature Checker 146 is to validate the sender of each message and to initiate the Key Request Protocol at appropriate times of need. While message encrypting is optional in the present embodiment of the security system, all messages must be signed by the originator to facilitate validation of the message source. The Signature Checker 146 performs these functions on both sides of the message processing cycle. When a message is created, the originator uses the Signature Checker 146 functionality to apply a signature to the message based on its Private Key. At the receiving end, the message Signature Checker 146 verifies that the "Sender:" field matches the sender's Public Key, as stored in the Keys Database 124. In the event of a Key not validating, the Signature Checker 146 initiates the Key Request by sending a request for a Key Update to the Key Authority (KA). While awaiting the response, the Signature Checker 146 re-submits the message to the Message Warehouse Manager 132 which places the message in the Pending Annex of the Message Warehouse 144. Also, if the key was present but incorrect, the offending key is removed from the Keys Database 124. The Signature Checker 146 enables local applications to add a signature to a message, and submit the signed message to the Message Warehouse Manager 132. It enables local applications to check message signatures, and sends rejected messages to the Pending Annex. The Signature Checker 146 automatically removes an offending key and initiates a Key Request message to the KA on failure.

Considering the Cryptor 150, the purpose of the Cryptor 150 is to encrypt and decrypt outgoing and incoming private messages. The Cryptor 150 applies standard encryption algorithms using Public and Private Keys to message payloads to ensure the secrecy of private messages. It references the Keys Database 124 for the necessary keys. In the event that a needed key is not present for encryption, the Cryptor 150 initiates a Key Request in an attempt to retrieve the missing key. The message to be encrypted is returned to the calling function with an error specifying the missing key problem. On decryption, the Cryptor 150 returns the decrypted message, or a notice that decryption failed. If the failure was due to an incorrect key entry, the Cryptor 150 also removes the offending key from the Keys Database 124. Cryptor must enable local applications to encrypt messages. The Cryptor 150 enables local applications to decrypt messages. It reacts to failed encryption attempts by returning the unencrypted message, and an error code that indicates the reason for failure. Failed encryption attempts due to missing Public Keys triggers the Cryptor 150 to initiate a Key Request to the KA. The Cryptor 150 reacts to failed decryption attempts by returning an error code that indicates the reason for failure, forwarding the message to the Message Warehouse Manager 132 for Jailing, and returning a "Bad Key" message to the sender.

Considering the RVP Cache Manager 142, the purpose of the RVP Cache Manager 142 is to install RVP List updates into the RVP Cache 122. When new RVPs are deployed in the present embodiment of the security system, a KA notifies all of its existing RVPs of the new additions. The RVP Cache Manager 142 of each of these nodes records the new list of RVPs in the RVP Cache 122 to facilitate subscription dialogs. When a non-RVP node is initiated, it may need to draw on a locally stored list of RVPs to make its initial connection into the security system. The RVP Cache Manager 142 is responsible for loading the RVP Cache from this configuration file as well. On initiation, the RVP Cache Manager 142 loads the RVP Cache 122 with Upline Relay Node entries from a configuration file. Upon receipt of a new RVP list from a KA, the RVP Cache Manager 142 updates the RVP Cache 122 by replacing the existing entries with new ones. The RVP Cache Manager 142 supports the registration of both RVP nodes and Upline Relay Nodes. An RVP node is an RVP as perceived from another RVP. An Upline Relay Node is either an RVP or a network vulnerability assessment scanner that accepts TNTL connections.

Considering the Key Manager 126, the purpose of the Key Manager 126 is to match URIs to Public Keys in the Keys Database 124, to accept new key updates into the database, and to remove bad keys from the database. The primary purpose of the Key Manager 126 is to keep the Keys Database updated. The Key Manager 126 process handles two types of messages: 1) "Key Update" messages, and 2) "Bad Key" messages. Key update messages are only accepted from the node's KA, and contain new or replacement Public Keys for the specified URIs. Bad Key messages can be sent from any node in response to an incorrect Public Key being used to encrypt a message. When the Key Manager 126 receives a valid Key Update message, it simply adds the URI Public Key pair to the Keys Database 124. For Bad Key messages, the entry for the specified URI is removed. The key reference libraries used by the Key Manager 126 are also available to the Signature Checker 146 and the Cryptor 150. These processes need to easily reference Public Keys by URI and apply them to their specific operations. The Key Manager 126 accepts Key Update messages only from the KA. It processes valid Key Update messages by inserting the URI Public Key pair into the Keys Database 124, possibly removing an existing entry to avoid contention, and processes Bad Key messages by removing the specified key from the Keys Database 124. The Key Manager 126 makes its key reference methods and key removal methods accessible to the Cryptor 150 and the Signature Checker 146.

Considering the Secondary Communications Gateway 148, the purpose of the Secondary Communications Gateway 148 is to accept and send messages from the Alternate Communications Medium 128, which may be E-mail, CDROM, or Floppy Disk. The messages are injected into the Message Warehouse 144, or pulled from the Message Warehouse 144 and forwarded to the Alternate Communications Medium 128.

The purpose of an E-mail Gateway (2CG-Email) is to accept messages from the email channel for injection into the Message Warehouse 144, and to pull appropriate messages out of the Warehouse for delivery via email. The E-mail gateway is a type of Secondary Communications Gateway 148 dedicated to receiving and sending messages via electronic mail. Its primary purpose is to strip e-mail headers away from the standard security network messages such that the message can be injected into the Message Warehouse 144, or to pull appropriate messages out of the Message Warehouse 144 for e-mail addressing and distribution. This requires a user interface for e-mail configuration administration. The 2CG-Email Gateway provides a user interface to define the mail protocol to use, incoming mail server to use (and User ID/Password), SMTP server to use (and User ID/Password), polling interval to check for new messages, and destination e-mail address to send messages to. It polls its specified incoming mail server for new messages according to the aforementioned configuration entry. Upon receipt of a new mail message, 2CG-Email Gateway strips off the e-mail headers and injects the standard security network message into the Message Warehouse 144 via the Message Warehouse Manager 132. When the Message Warehouse Manager 132 announces a message for the "email" subscription, 2CG-Email pulls the message from the Message Warehouse 144 via the Message Warehouse Manager 132. Once the outgoing message has been pulled from the Message Warehouse 144, the 2ECG-Email Gateway encrypts and signs the message using Cryptor 150 and SigCheck 146, adds the appropriate mail headers for delivery, and sends the E-mail to the outgoing mail server.

The purpose of the CDROM Gateway (2CG-CDROM) is to accept messages from a CDROM for injection into the Message Warehouse 144. The CDROM Gateway is a type of Secondary Communications Gateway 148 dedicated to receiving messages via a compact disc. Its primary purpose is to locate new messages on the CDROM file system and inject them into the Message Warehouse 144 via the Message Warehouse Manager 132. This piece will require a "database" of files that have been processed to avoid reprocessing of messages if the disc remains in the drive. The 2CG-CDROM Gateway must poll the CDROM drive for new messages. Upon finding a new file, the 2CG-CDROM Gateway injects the file as a standard security network message into the Message Warehouse 144 via the Message Warehouse Manager 132. Upon processing the file, the 2CG-CDROM Gateway updates a list of processed files to help determine if future files found on the CDROM or Floppy file systems are new or existing.

The purpose of the Floppy Gateway (2CG-Floppy) is to accept messages from a Floppy Disk for injection into the Message Warehouse 144 and to write distress messages to the floppy if available. The Floppy Gateway is a type of Secondary Communications Gateway 148 dedicated to receiving messages from and writing distress messages to a floppy disk. The 2CG-Floppy Gateway locates new messages on the Floppy Disk file system and injects them into the Message Warehouse 144 via the Message Warehouse Manager 132. New message determination is made by referencing the same "database" of files that 2CG-CDROM Gateway uses. The 2CG-Floppy Gateway also responds to "Floppy" subscription messages by pulling the messages out of the Message Warehouse 144 via the Message Warehouse Manager 132, encrypting and signing them, and writing them to the Floppy file system (if available). The Floppy subscription is installed at startup as a Permanent subscription, and does not rotate with other fallback communications media. Only Distress messages are sent to the 2CG-Floppy Gateway. Distress Message Creation is relegated to the diagnostic libraries. Since Floppy subscriptions are neither rotated nor deleted, there is no need to notify the Message Warehouse Manager 132 of failed deliveries of messages to the Floppy disk. The 2CG-Floppy Gateway polls the Floppy drive for new messages. Upon finding a new file, 2CG-Floppy Gateway injects the file as a standard security network message into the Message Warehouse 144 via the Message Warehouse Manager 132. Upon processing the file, 2CG-Floppy Gateway updates a list of processed files to help determine if future files found on the CDROM or Floppy file systems are new or existing. The 2CG-Floppy Gateway reacts to Floppy subscriptions by pulling associated messages from the Message Warehouse 144 via the Message Warehouse Manager 132 and writing them to the Floppy file system (if available).

Considering the Application X 140 shown in FIG. 1, the purpose of the Application X 140 is to enable user specified programs to be executed on a SNTL.

Figure 2A:
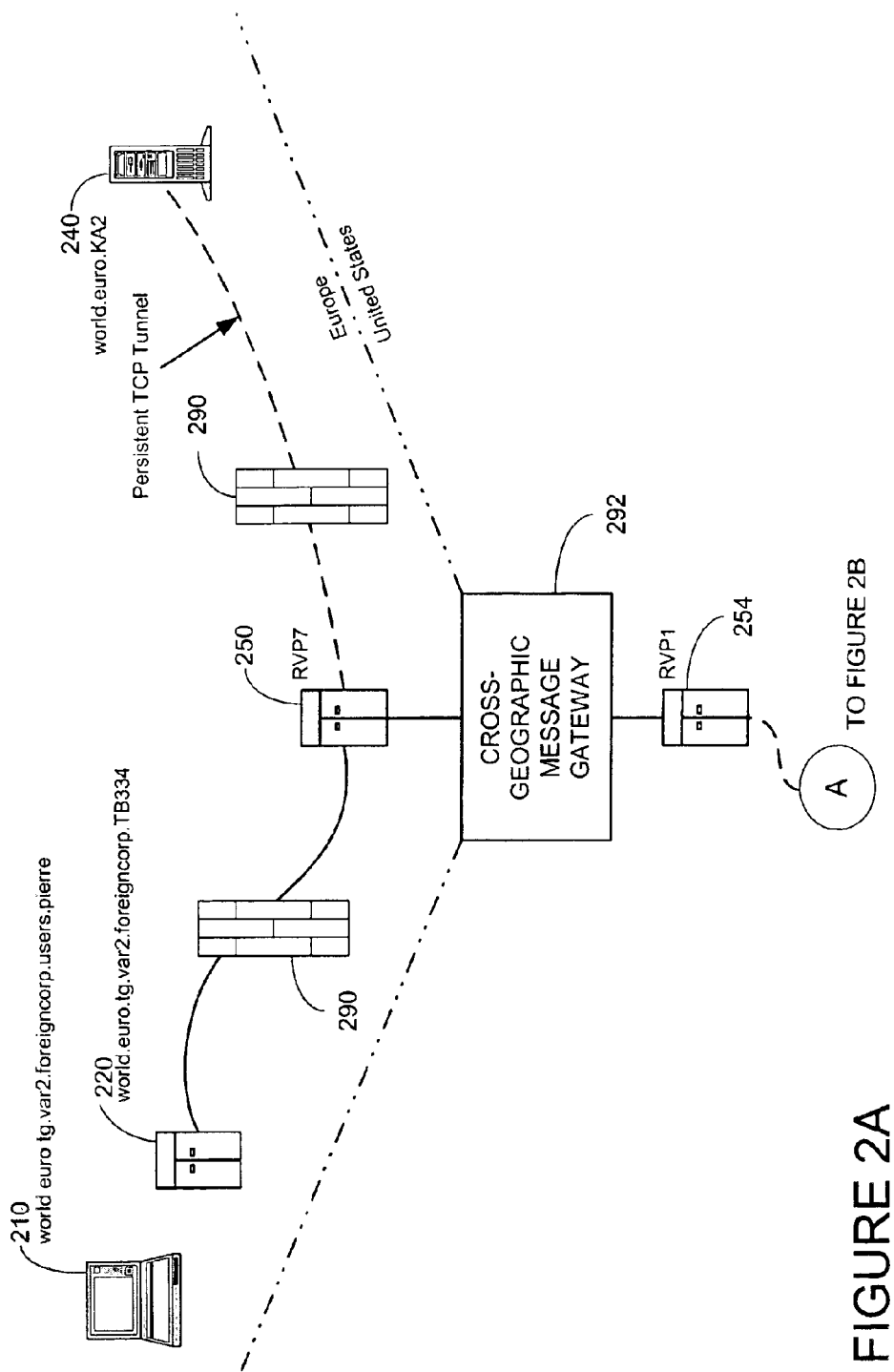
FIG. 2 shows a network configuration that employs an embodiment of the present invention.
Figure 2B:
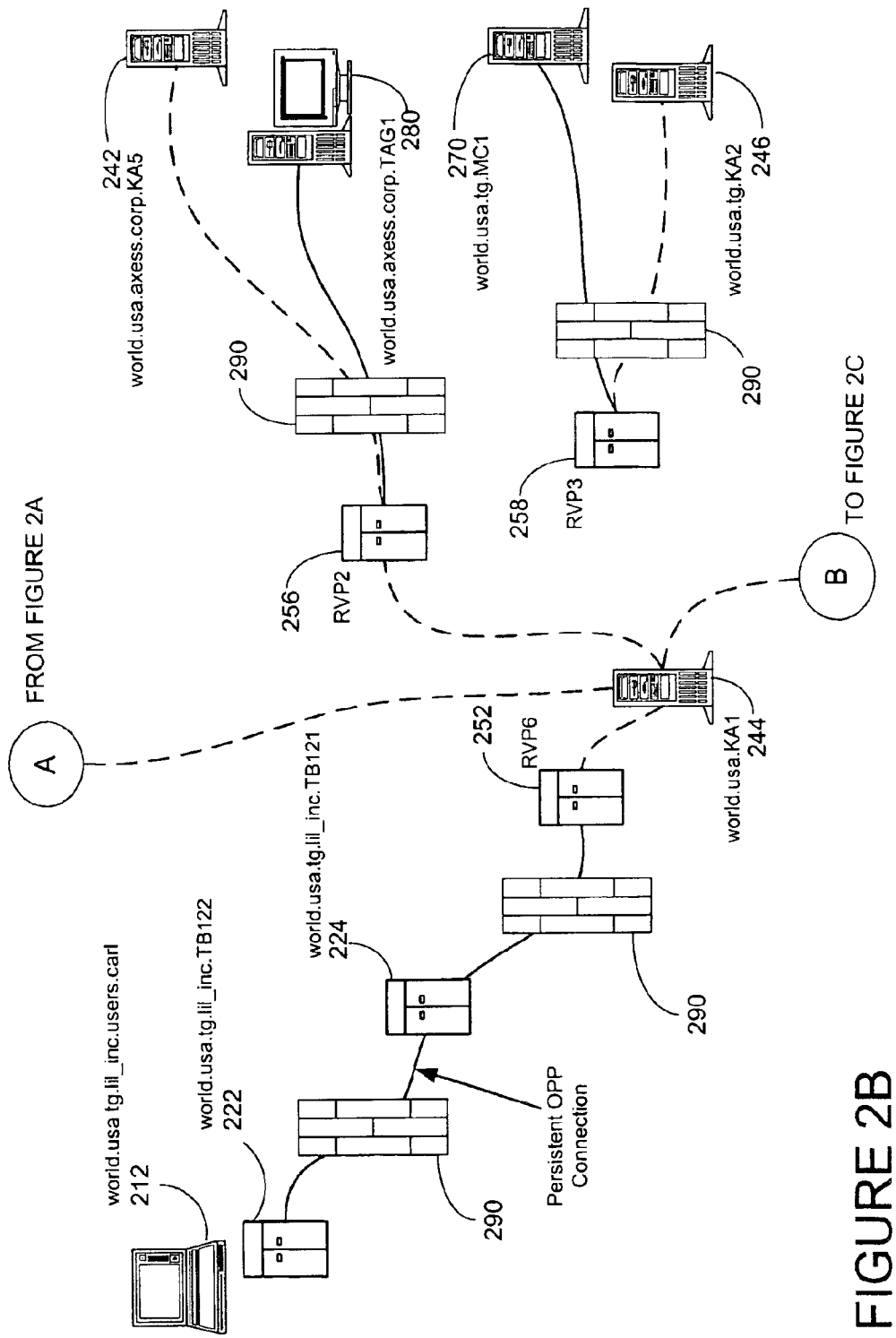
Figure 2C:
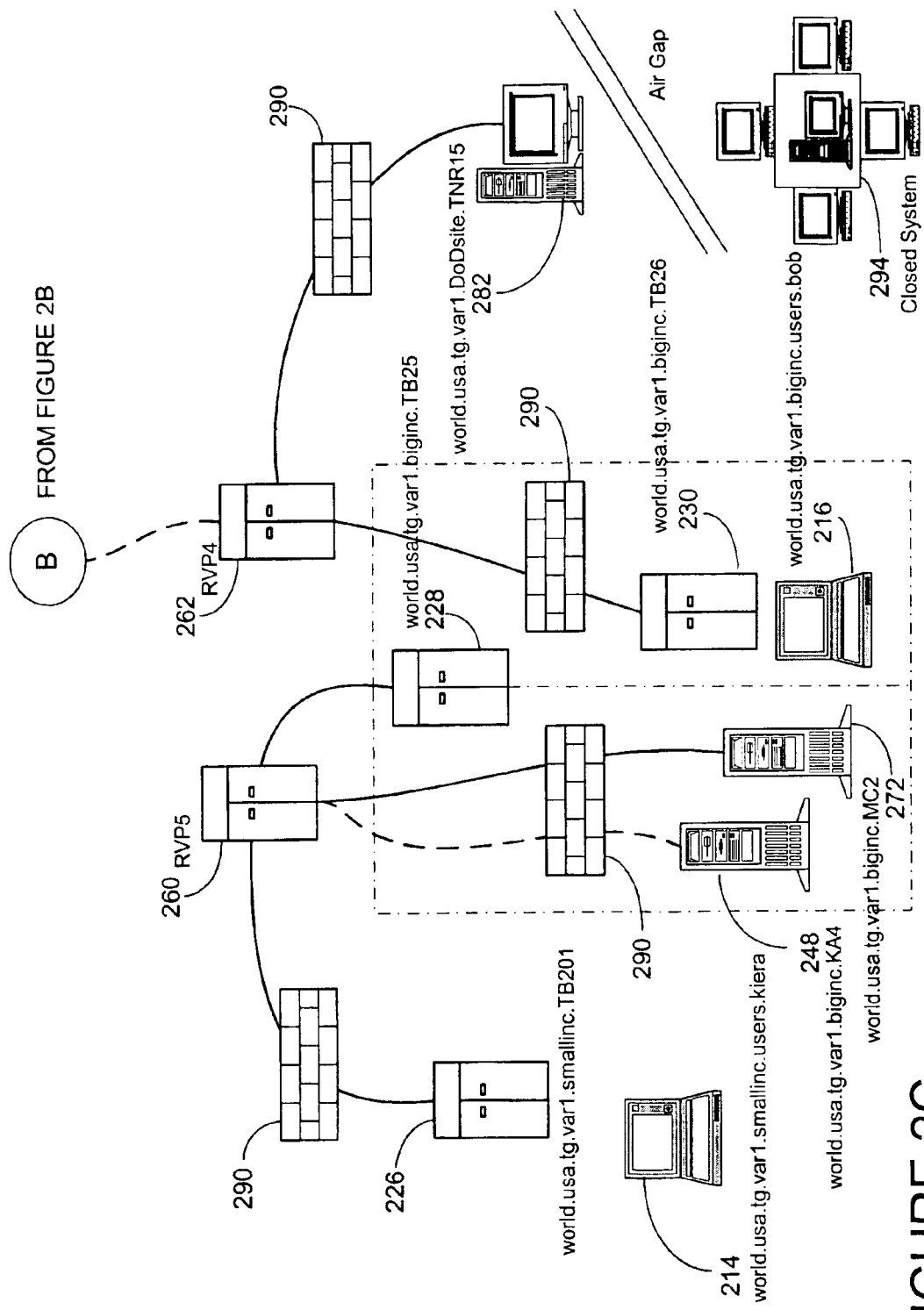

Turning to FIG. 2, FIG. 2 shows a network configuration 200 that employs an embodiment of the present invention. FIG. 2 shows a distributed network comprising four users 210, 212, 214, 216, six network vulnerability scanners (NVS) 220, 222, 224, 226, 228, 230, five Key Authorities (KAs) 240, 242, 244, 246, 248, seven Rendezvous Peers (RVPs) 250, 252, 254, 256, 258, 260, 262, two Master Consolidators (MCs) 270, 272, one Security Access Gateway (SAG) 280, one Security Receiver (SR) 282, ten firewalls (FWs) 290, one geographic barrier 292, and an unconnected closed system 294. The functional elements of a SNTL described above are included in the RVPs shown in FIG. 2. In addition to the elements of a security network shown in FIG. 2, there are several other functional elements that reside on some of the network nodes to facilitate operation of the security network. These elements include a Security Internal Listener, a Security Access Gateway, and a Security Access Controller. The operation of the elements of the network 200 shown in FIG. 2 are described in more detail below with reference to descriptions of message communications within the network 200.

Considering the Security Internal Listener, the purpose of the Security Internal Listener is to provide a facility to encrypt the message streams of third party applications such that a Security Access Gateway can decrypt them. The Security Internal Listener is a facility that's started up on a user's workstation as the gateway to an encrypted conduit to a protected resource. These resources are IP-based services that are removed from public accessibility by firewalls and/or other network barriers. A negotiated forwarded port makes a connection through those barriers possible, but data streams are encrypted in such a way to only allow a particular user to make system accesses using only pre-coordinated applications. The Security Internal Listener provides a local resource for network-aware applications to connect to and communicate through. It obtains the hash of any application trying to connect to it, where the hash is used as a signature to validate the transmission. The Security Internal Listener establishes the connection to the forwarded resource once the hash has passed its validation check. It encrypts the outgoing traffic with a combination of the receiving Security Access Gateway's Public Key and the application's hash, and decrypts incoming traffic with its hosts Private Key, where the hash is used as a signature to validate the transmission.

Considering the Security Access Gateway 280 shown in FIG. 2, the purpose of the Security Access Gateway is to decrypt message streams originating from a distant Security network node as encrypted by a Security Internal Listener. When a node requests access to a resource, that node sends the Security Access Gateway a connection request along with its credentials. The credentials include a user ID, password, digital signature, and application hash. Based on this information, the Security Access Gateway can forward a service made available on an RVP. The Security Access Gateway then acts as a decryption gateway to the requested resource, encrypting and decrypting streams with the appropriate combination of keys and application hashes. The Security Access Gateway validates the requestor's user ID, password, digital signature, and application hash, where the hash is used as a signature to validate the transmission, against a local database prior to establishing a forwarded service for the requestor. Upon proper validation, the Security Access Gateway establishes a tunneled connection between itself and a selected RVP. The establishment of this tunnel includes a specification to the RVP of who is expected to connect to the new resource. When traffic comes in through the tunnel, the Security Access Gateway decrypts the stream using its own Private Key, where the hash is used as a signature to validate the transmission. When traffic is sent back through the tunnel, the Security Access Gateway encrypts the stream using the recipient's Public Key, where the hash is used as a signature to validate the transmission. The Security Access Gateway has the ability to record keystrokes and application-level requests as sent from the user. This logging has various and configurable levels of reporting and an auto-cleanup feature to keep the logs from exhausting Security Access Gateway system resources.

Considering the Security Access Controller, the purpose of the Security Access Controller is to ensure that connections initiated by a forwarded Security Internal Listener are permitted only from the pre-approved source. When a Security Access Gateway specifies the user/source of a tunneled resource, the Security Access Controller applies access controls to the newly available service such that only the requestor can connect. This gets a bit trickier than standard ACL implementations such as firewall rules or TCP Wrappers because the source address could potentially and legitimately change during negotiation. Upon establishment of a tunnel to a Security Access Gateway resource, the Security Access Controller installs access controls that drop packets that are not from the specified end user.

The following describes message handling within a SNTL based on various requests. The description references various flow diagrams in addition to the functional modules illustrated in FIG. 1 and described above. The Message Warehouse Manager 132 acts as a broker for the Message Warehouse 144 by shuttling messages in and serving as a controlled gateway for getting messages out. The Message Warehouse Manager 132 also notifies all SNTL applications of new message arrivals as well as existing messages that match new subscriptions. As each process makes a request to read the message, the Message Warehouse Manager 132 records which processes have handled the message. Before expiring a message from the Message Warehouse 144, the Message Warehouse Manager 132 reminds non-responding applications of the message's existence. This serves the double purpose of 1) a safety net in case the first notification was erroneous, and 2) giving applications opportunities to re-evaluate their interest in the messages in consideration of newly injected subscriptions. Finally, the Message Warehouse Manager 132 enforces Message Warehouse 144 expirations by purging the appropriate messages from the Message Warehouse 144.

Figure 3:
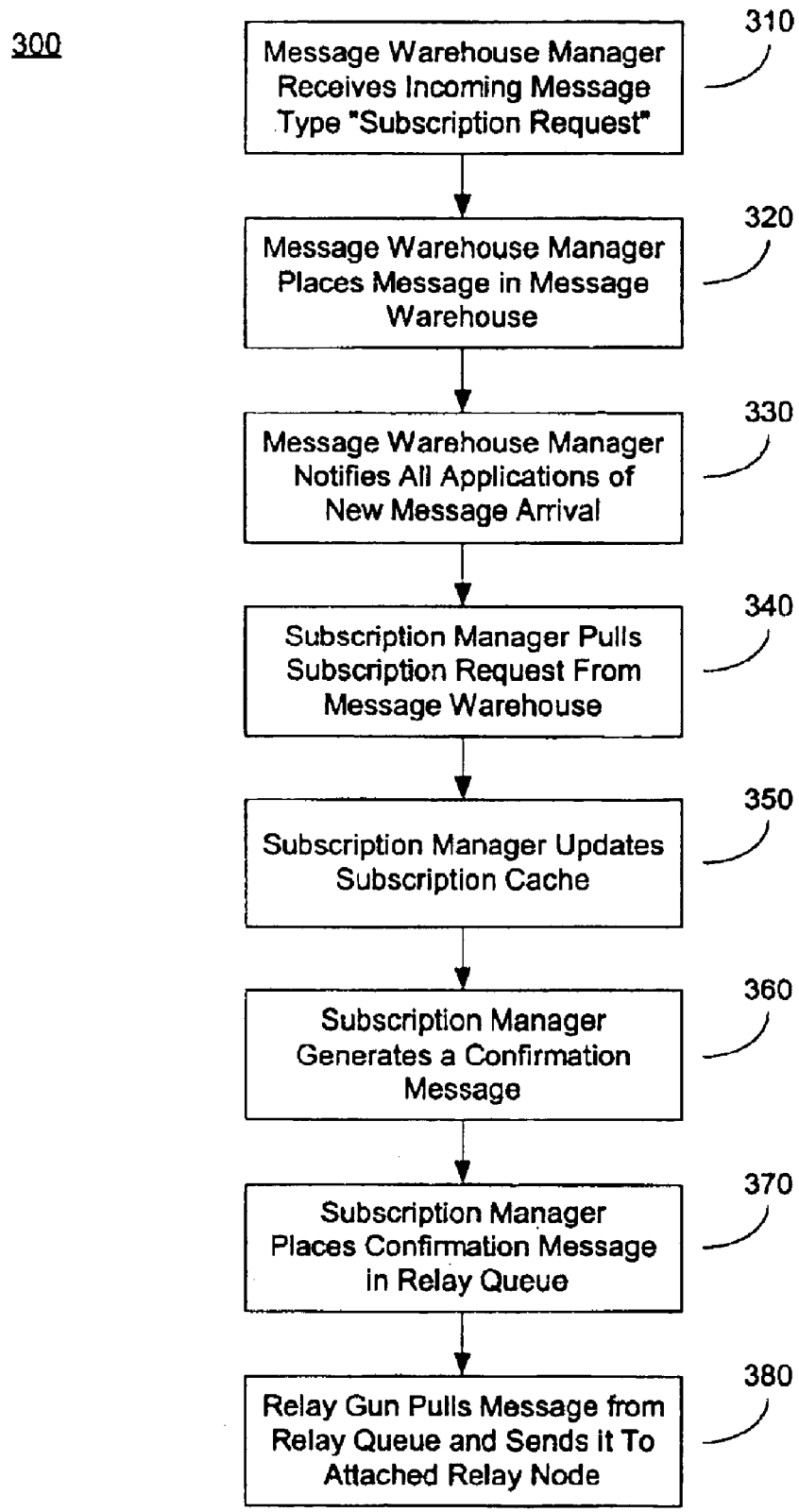
FIG. 3 shows a flow diagram of processing a Subscription Request.

Turning to FIG. 3, FIG. 3 shows a flow diagram of processing a Subscription Request 300. When the Message Warehouse Manager receives an incoming message of type "Subscription Request" 310, the Message Warehouse Manager places the message in the Message Warehouse 320 and notifies all SNTL applications of the new message's arrival 330, designated by Message Addressee and Message ID. The Subscription Manager pulls the Subscription Request out of the Message Warehouse 340 and updates the Subscription Cache accordingly 350. The Subscription Manager generates a confirmation message 360, and places it on the Relay Queue 370. The Relay Gun pulls the message off the Relay Queue and sends it to the attached Relay Node 380. In referencing the Message Warehouse and Routing & Relay Queues, the term "pull" means to read and remove the message. The term "read" means to read the message, but leave it intact for others to read. Message Warehouse processors only pull messages when (1) the message is addressed discretely (not as a broadcast), and (2) the route to the recipient is known. If either of these conditions fails to exist, the message in question is simply read from the Message Warehouse, allowing other processes to resolve the delivery.

There exists a possibility for a message to be pulled and placed on the Relay. Queue, and then expire there due to a Relay node's SNTL connection being terminated. In this case, the Subscription Manager pulls the expired message off of the Relay Queue, removes the offending subscription cache entry, and re-injects it into the Message Warehouse. This should trigger the Router Daemon to broadcast a Subscription Inquiry to all RVPs. Regarding Message Queues, all messages on the Relay Queue are destined for a specific Relay Node. Therefore, if a message expires on the Relay Queue, a new route must be determined to deliver the message and the invalid subscription needs to be removed from the Subscription Cache. Messages on the Routing Queue are also destined for a particular RVP. A message destined for multiple RVPs remains intact in the Message Warehouse and read multiple times, once for each RVP recipient. On expiration, the Message Warehouse Manager removes the message from the Message Warehouse.

Returning to FIG. 2, considering permanent subscriptions, "Permanent Subscriptions" are cached subscriptions with no or very long expiration times. These subscriptions are used in two cases: (1) created as a configuration item on installation of an RVP to identify Cross-Geographic Message Gateways (XMGs), or (2) established at runtime on a network vulnerability scanner or connecting through a firewall to an upline network vulnerability scanner or RVP. For the XMG 292 shown in FIG. 2, a permanent subscription on RVP1 254 may look like "TCP:RVP7:world.euro.*" to let RVP1 254 know to route all European messages to RVP7 250 via direct TCP connection. Likewise, when TB121 224 makes a SNTL connection to RVP6 252, TB121 224 gets an entry such as "TNTL:RVP6:world.*" in its Subscription Cache. All messages going anywhere will thus be placed on a Relay Queue for delivery to RVP6 254. Lastly, when TB122 222 makes a SNTL connection to TB121 224, TB122 222 creates a Subscription Cache entry such as "TNTL:TB121:world.*". The above plan creates a routing contradiction. For example, when TB122 222 makes a connection to TB121 224, TB121 224 potentially has the following opposing Subscription Cache entries:

TNTL:RVP6:world.*
TNTL:TB122:world.tg.lil_inc.TB122
TNTL:TB122:world.tg.lil_inc.users.carl So, when a message is placed in TB121's Message Warehouse for Carl 212, the Subscription Manager tries to send the message to both TB122 222 and RVP6 252 when it should only be routed to TB122 222. To handle this scenario, subscriptions are handled from discrete to the most general. The above list could thus be rearranged as follows:

TNTL:TB122:world.tg.lil_inc.TB122
TNTL:TB122:world.tg.lil_inc.users.carl
TNTL:RVP6:world.*

As subscriptions are evaluated, routing decisions halt at the first match. Therefore, a message addressed to Carl 212 would get to the second entry, be processed, and not be subject to the "world.*" mask. Security network elements that connect via SNTL also hold permanent subscriptions on their respective connection points. A keepalive connection monitor continually evaluates the health of the connection from both sides. On the client side, a break in the keepalive volley triggers reconnection attempts (either to the same connection point or to a better one). On the server side, a break in the keepalive volley triggers the removal of the associated permanent subscription from the Subscription Cache.

Figure 4:
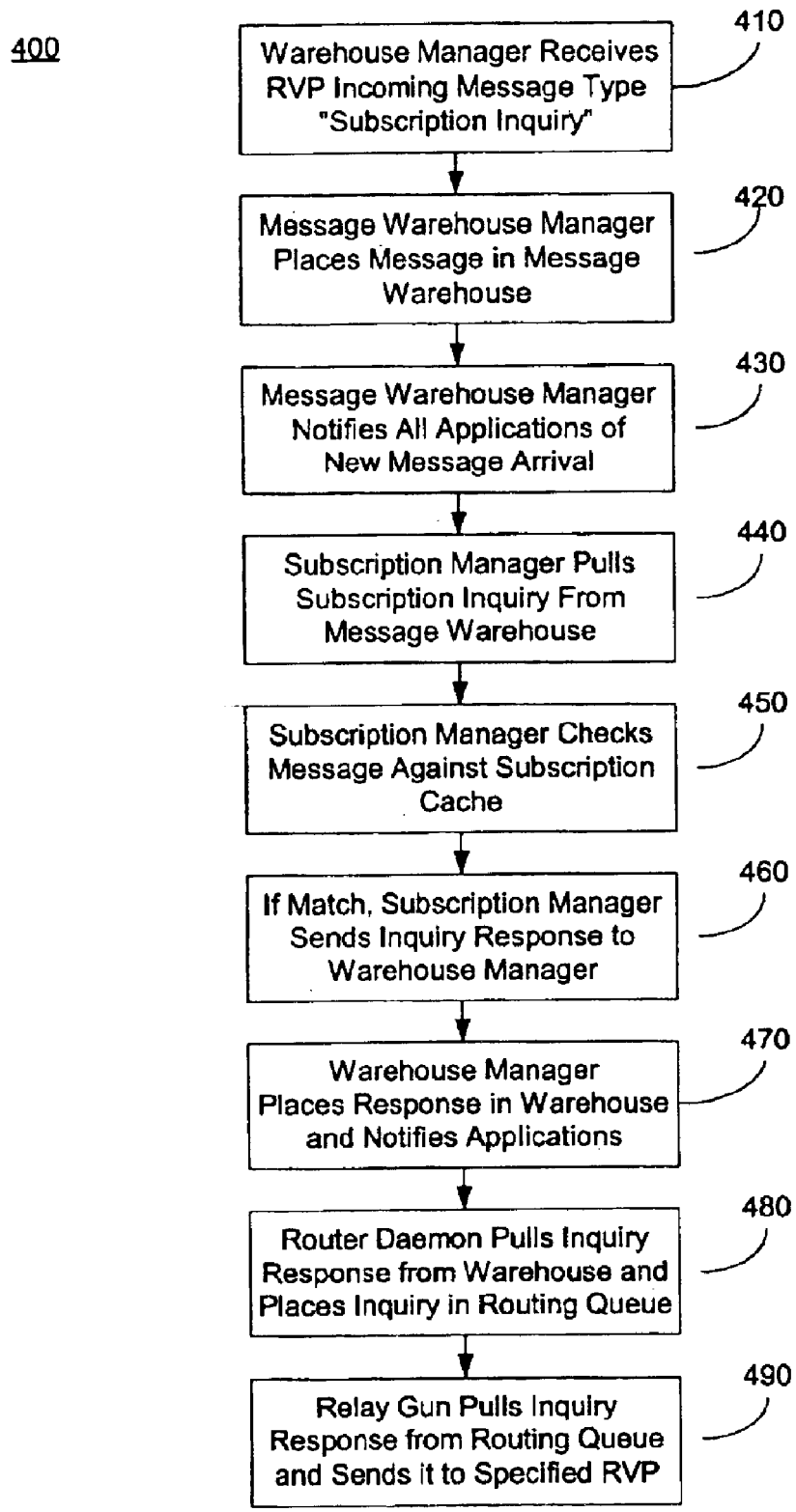
FIG. 4 shows a flow diagram of processing a Subscription Inquiry.

Turning to FIG. 4, FIG. 4 shows a flow diagram of processing a Subscription Inquiry 400. The Message Warehouse Manager receives an incoming "Subscription Inquiry" from an RVP 410, places it in the Message Warehouse 420, and notifies all SNTL applications of its arrival 430. The Subscription Manager pulls the Subscription Inquiry out of the Message Warehouse 440 and checks it against the Subscription Cache 450. If there is a match, the Subscription Manager generates a Subscription Inquiry Response addressed to the originating RVP and hands it to the Message Warehouse Manager 460. The Message Warehouse Manager places the message in the Message Warehouse and notifies all applications of its arrival 470. The Router Daemon pulls the Subscription Inquiry Response out of the Message Warehouse and places it on the Routing Queue 480. The RVP Gun pulls the Subscription Inquiry Response off of the Routing Queue, sending it to the specified RVP 490.

Figure 5:
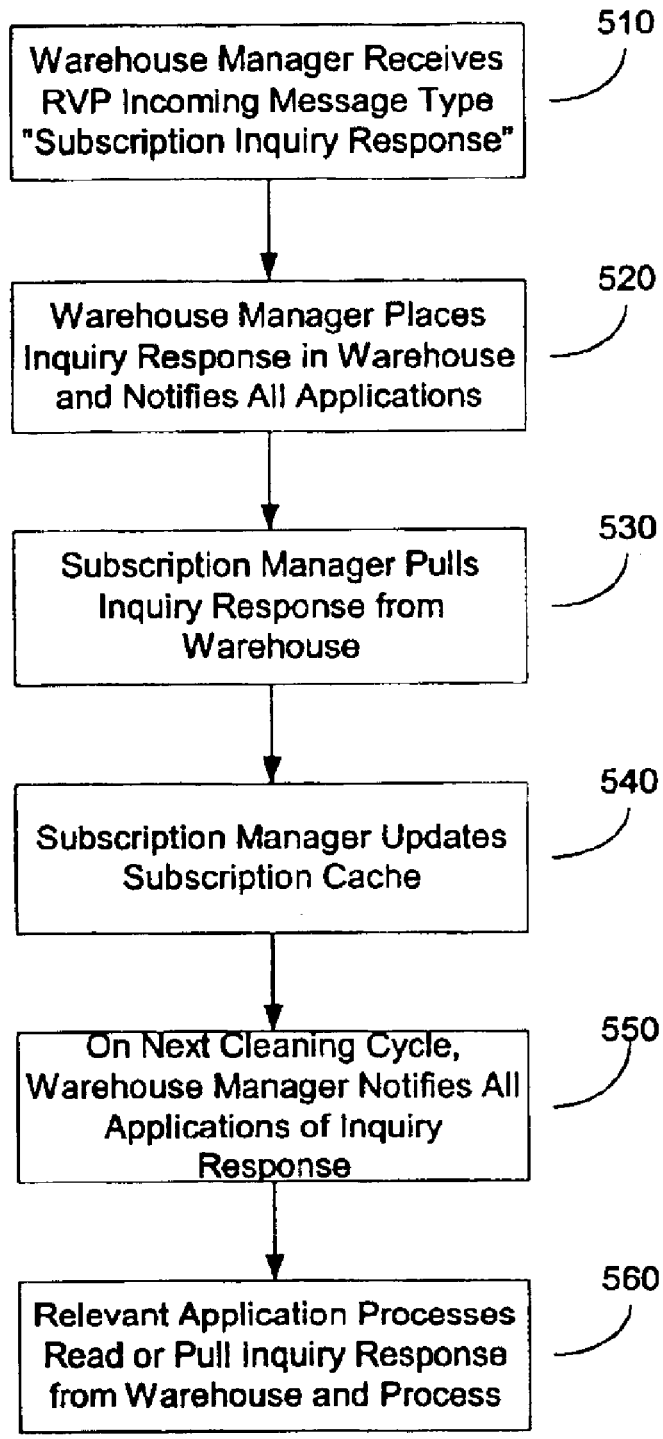
FIG. 5 shows a flow diagram of processing a Subscription Inquiry Response.

Turning to FIG. 5, FIG. 5 shows a flow diagram of processing a Subscription Inquiry Response 500. When the Message Warehouse Manager receives an incoming "Subscription Inquiry Response" from an RVP 510, it places it in the Message Warehouse and notifies all SNTL applications of its arrival 520. The Subscription Manager pulls the Subscription Inquiry Response out of the Message Warehouse 530 and updates the Subscription Cache 540. On the next Warehouse cleaning cycle, the Message Warehouse Manager notifies all processes that have not yet read a message about the continued presence of that message 550. Processes that now have an interest due to the new subscription entry read or pull the message from the Warehouse.

Figure 6:
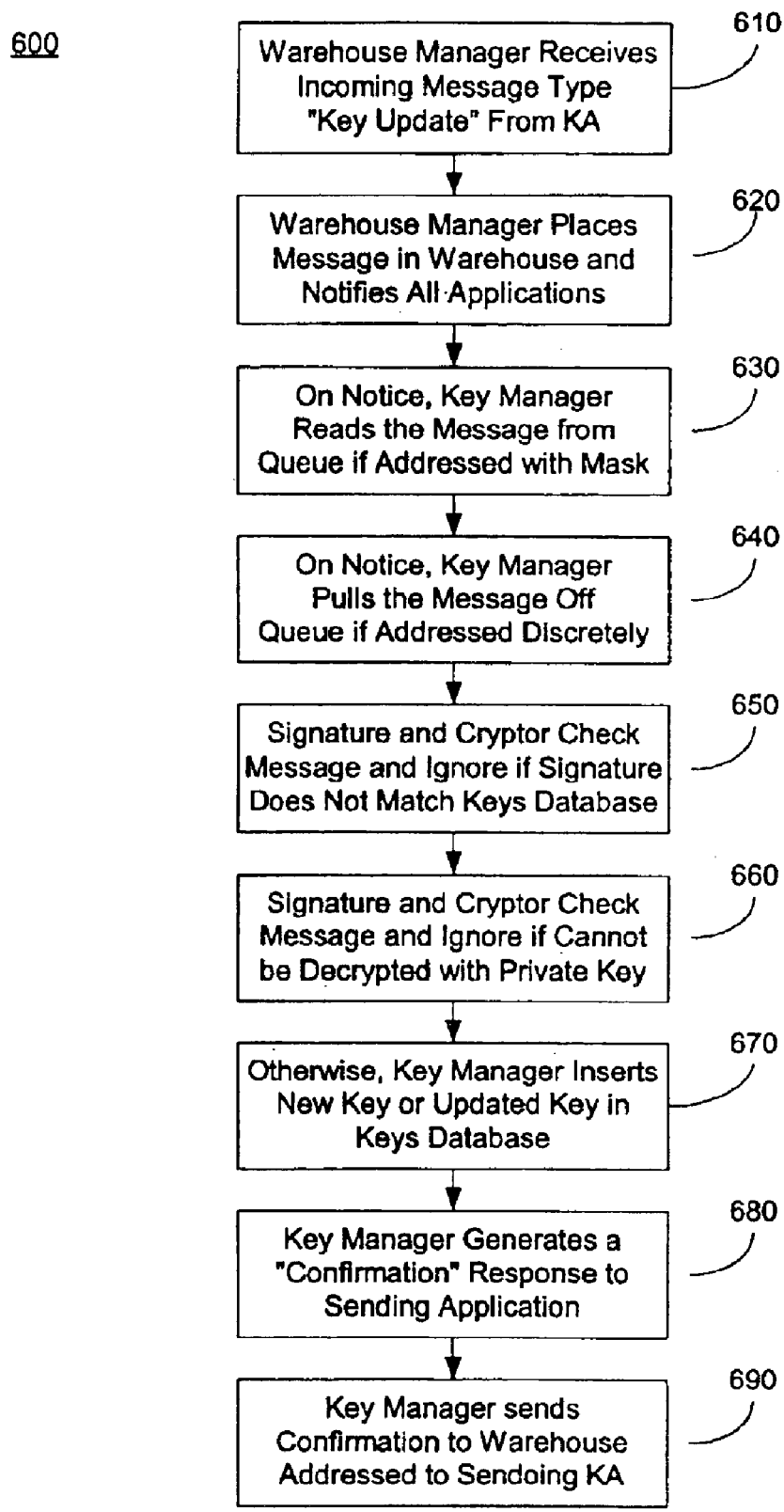
FIG. 6 shows a flow diagram for processing a Key Update.

Turning now to FIG. 6, FIG. 6 shows a flow diagram for processing a Key Update 600. The Message Warehouse Manager receives the "Key Update" message 610, it places the message in the Message Warehouse, and notifies all applications of its arrival 620. The Key Manager notices the Key Update and if the message is addressed with a mask, the Key Manager reads the message from the queue 630. If the message is addressed discretely, the Key Manager pulls the message off of the queue 640. The message is passed through the Signature Checker and Cryptor libraries before being processed by the Key Manager. The message header indicates the sender. If the signature on the message does not match what's in the keys database, then the message is ignored 650. If the message cannot be decrypted with the node's Private Key, then it is ignored 660. The Key Manager processes the new key by inserting it as a new entry in the keys database, or updating an existing entry 670. The Key Manager generates a "Confirmation" response to the sending application 680. The Signature Checker and Cryptor libraries are used to encrypt and sign the response. The Key Manager places the Confirmation in the Message Warehouse addressed to the KA who sent the original message 690.

Figure 7:
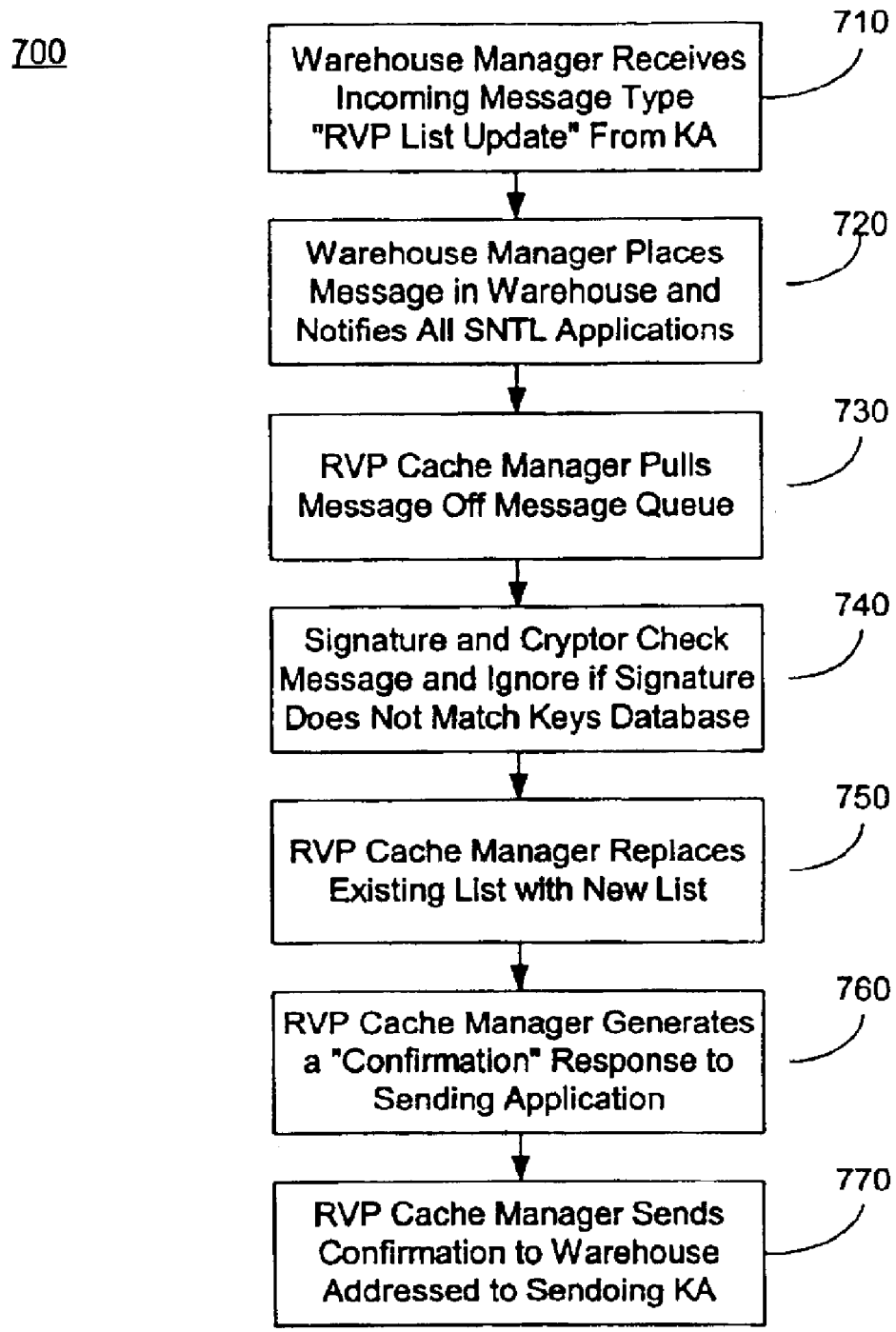
FIG. 7 shows a flow diagram for processing a RVP List Update.

Turning now to FIG. 7, FIG. 7 shows a flow diagram for processing a RVP List Update 700. The Message Warehouse Manager receives the "RVP List Update" message 710, places it in the Message Warehouse, and notifies all applications of its arrival 720. The RVP Cache Manager pulls the message off of the Message Queue 730. The message is passed through the Signature Checker and Cryptor libraries before being processed. The message is ignored if its signature does not match keys in the Keys Database 740. The RVP Cache Manager processes the message by replacing the existing list with the new one 750. A backup message is made to provide a regression path to recovery. The RVP Cache Manager generates a Confirmation response to the sending application 760. The Signature Checker and Cryptor libraries are used to encrypt and sign the response. The RVP Cache Manager then places the Confirmation in the Message Warehouse addressed to the KA who sent the original message 770.

Figure 8:
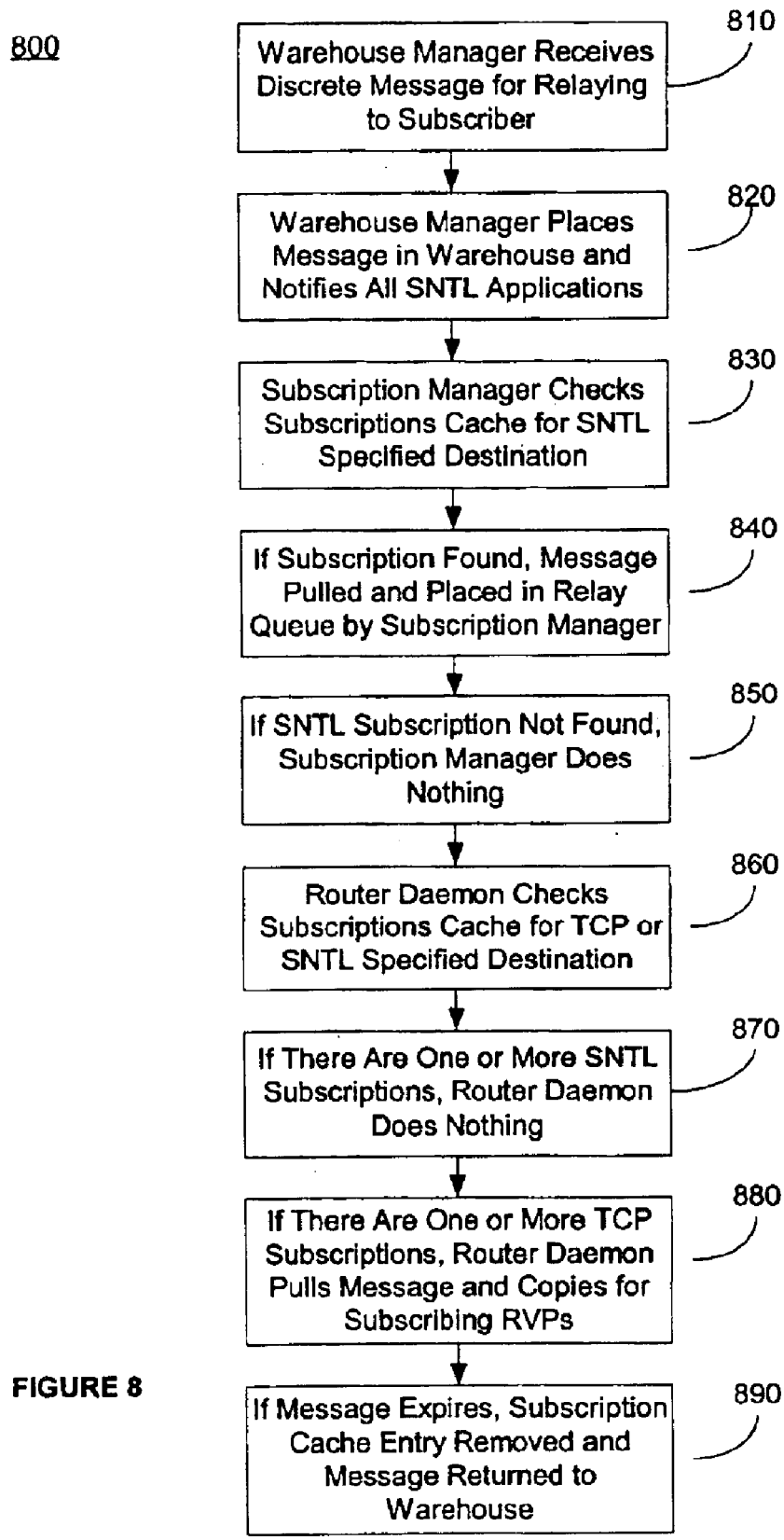
FIG. 8 shows a flow diagram for relaying a discrete message to a subscriber.

Turning now to FIG. 8, FIG. 8 shows a flow diagram for relaying a discrete message to a subscriber 800. The Message Warehouse Manager receives the message 810, places it in the Message Warehouse, and notifies all applications of its arrival 820. The Subscription Manager references the Subscription Cache to determine if there is a TNTL-based subscription for the specified destination 830. If there is, the Subscription Manager pulls the message out of the Message Warehouse and places it on the Relay Queue for delivery to the subscriber 840. If there is not, the Subscription Manager does nothing 850. The Router Daemon references the Subscription Cache to determine if there are any subscriptions (TNTL or TCP) for the specified destination 860. If there are one or more SNTL-based subscriptions, the Router Daemon does nothing 870. If there are one or more TCP-based subscriptions, the Router Daemon pulls the message from the Message Warehouse and prepares a copy for each subscribing RVP 880. If there are no subscriptions for the message, the Router Daemon sends out a Subscription Inquiry to all known RVPs. If the message expires on either the Relay or Router Queue, the triggering Subscription Cache entry is removed, and the message is returned to the Message Warehouse 890.

Figure 9:
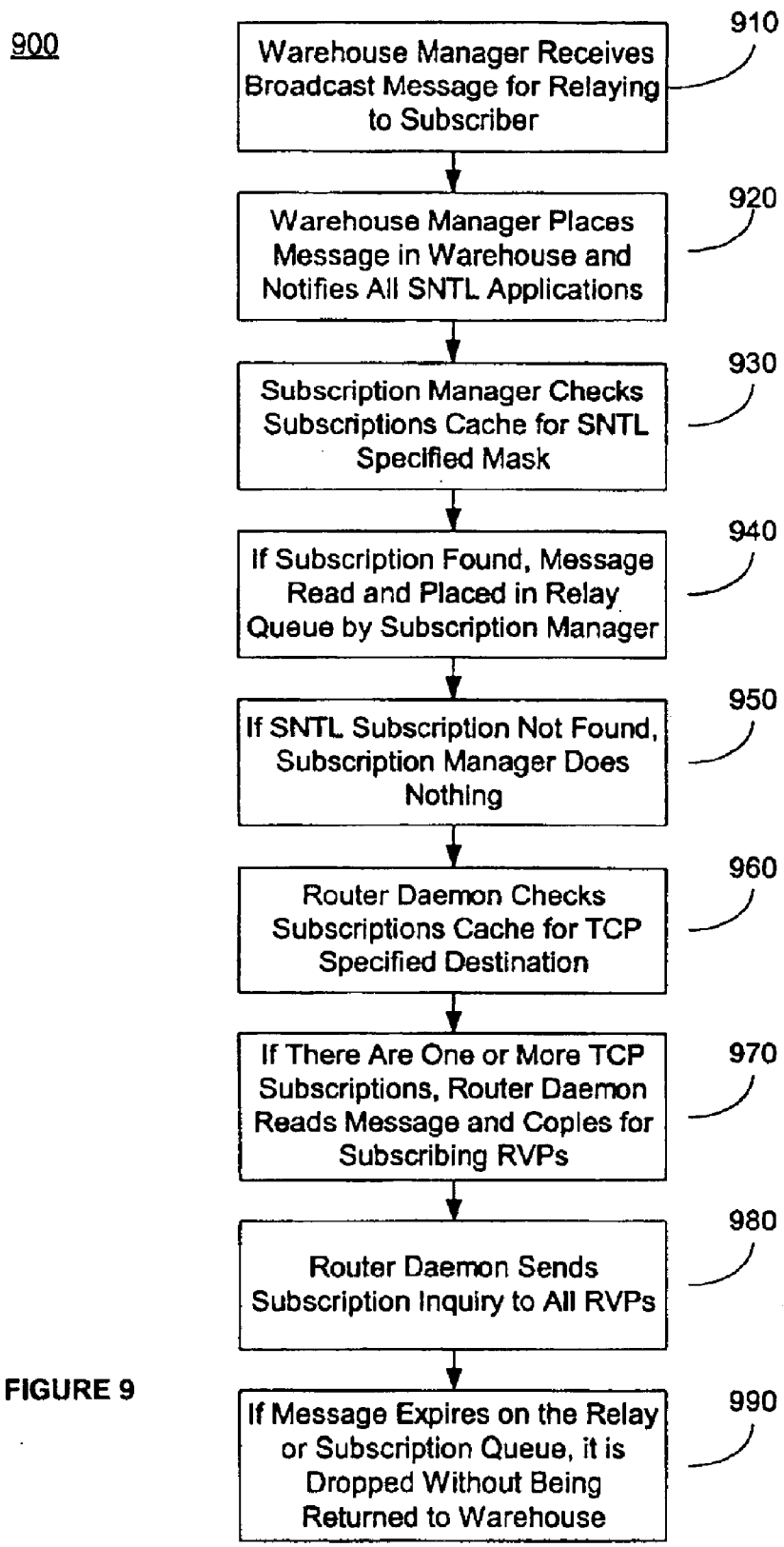
FIG. 9 shows a flow diagram for relaying a broadcast message to a subscriber.

Turning to FIG. 9, FIG. 9 shows a flow diagram for relaying a broadcast message to a subscriber 900. The Message Warehouse Manager receives the message 910, places it in the Message Warehouse, and notifies all applications of its arrival 920. The Subscription Manager references the Subscription Cache to determine if there is a TNTL-based subscription for the specified mask 930. If there is, the Subscription Manager reads the message from the Message Warehouse and places a copy on the Relay Queue for delivery to each subscriber 940. The Subscription Manager keeps track of which Relay Node(s) were sent the message to eliminate duplicate transmissions. If there are no TNTL-based subscriptions, the Subscription Manager does nothing 950. The Router Daemon references the Subscription Cache to determine if there are any TCP-based subscriptions for the specified mask 960. If there are one or more TCP-based subscriptions, the Router Daemon reads the message from the Message Warehouse and prepares a copy for each subscribing RVP 970. Regardless of the Subscription Cache entries, the Router Daemon sends a Subscription Inquiry to all RVPs, allowing them to express interest in the broadcast message 980. If a broadcast message expires on either the Relay or Router Queue, it is simply dropped without being returned to the Message Warehouse 990.

Figure 10:
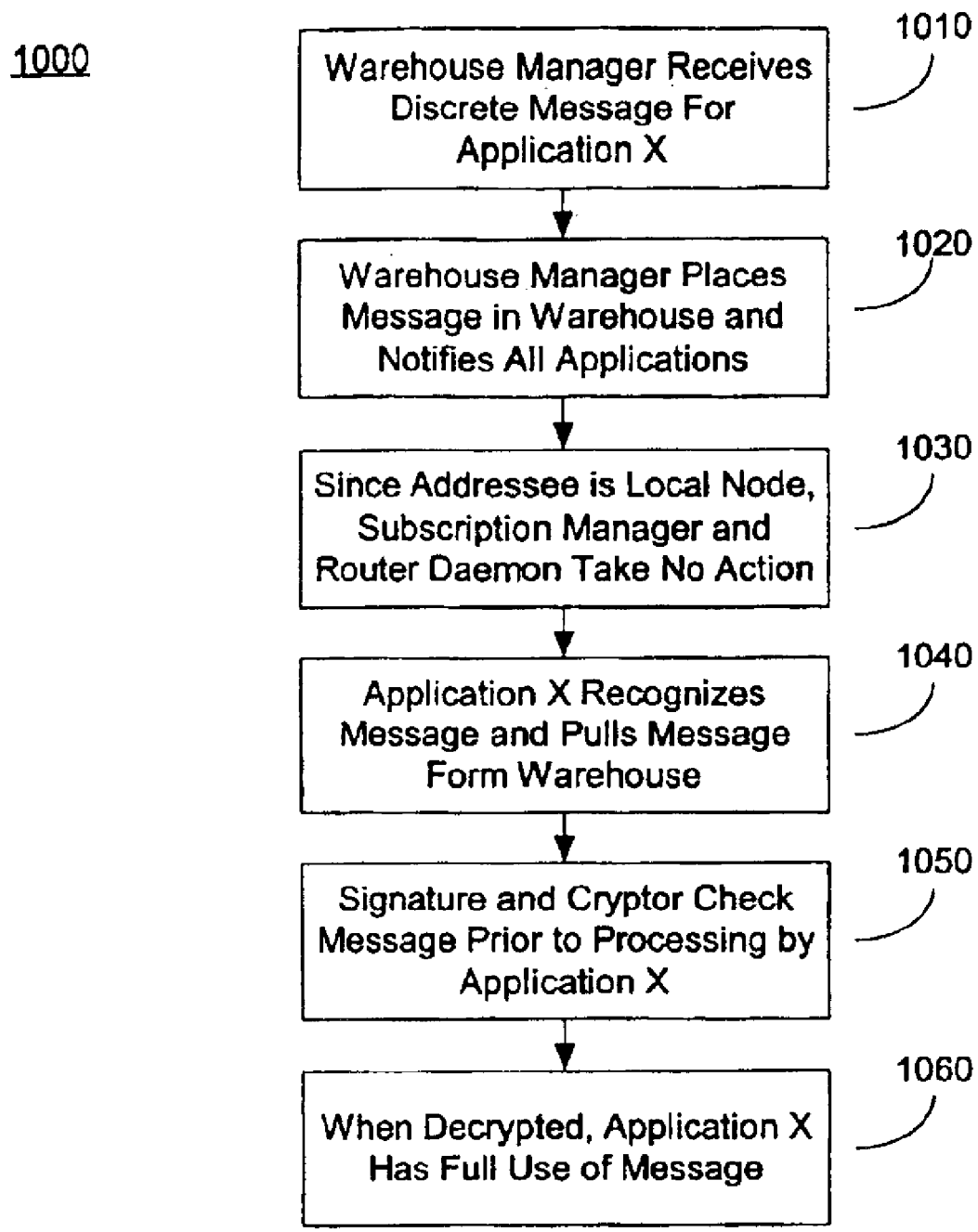
FIG. 10 shows a flow diagram for processing a discrete message for Application X.

Turning now to FIG. 10, FIG. 10 shows a flow diagram for processing a discrete message for Application X 1000, shown in FIG. 1. The Message Warehouse Manager receives the message 1010, places it in the Message Warehouse, and notifies all applications of its arrival 1020. Seeing that the addressee is the local node, neither the Subscription Manager nor the Router Daemon takes any action on the message 1020. Application X recognizes the message and pulls it out of the Message Warehouse 1030. The message is passed through the Signature Checker and Cryptor libraries before being processed by Application X 1040. Once successfully decrypted, Application X has full use of the message 1050.

Figure 11:
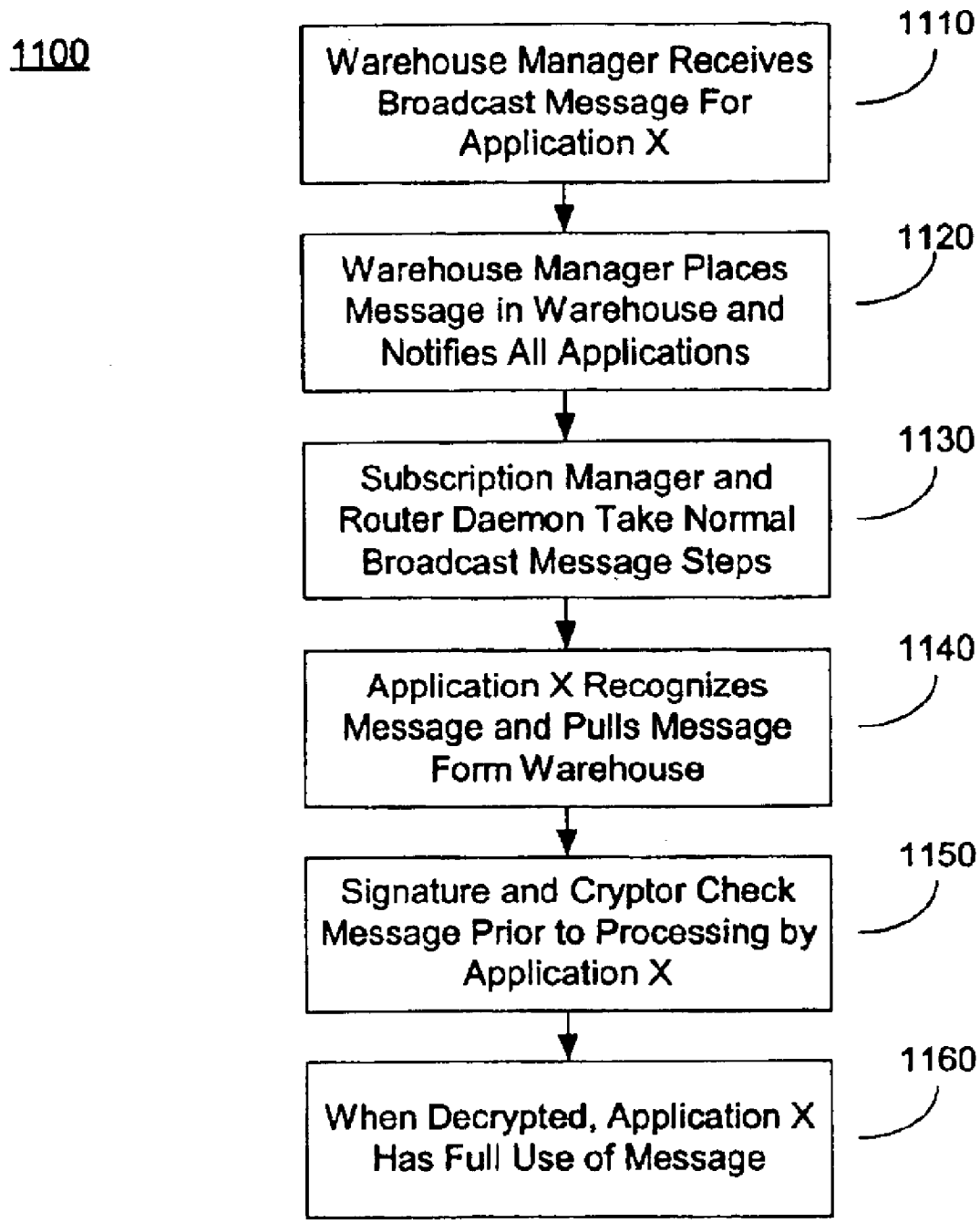
FIG. 11 shows a flow diagram for processing a broadcast message for Application X.

Turning now to FIG. 11, FIG. 11 shows a flow diagram for processing a broadcast message for Application X 1100. The Message Warehouse Manager receives the message 1110, places it in the Message Warehouse, and notifies all applications of its arrival 1120. The Subscription Manager and the Router Daemon perform their normal broadcast message handling steps 1130. Application X recognizes the message and reads it out of the Message Warehouse 1140. The message is passed through the Signature Checker and Cryptor libraries before being processed by Application X 1150. Once successfully decrypted, Application X has full use of the message 1160.

Figure 12:
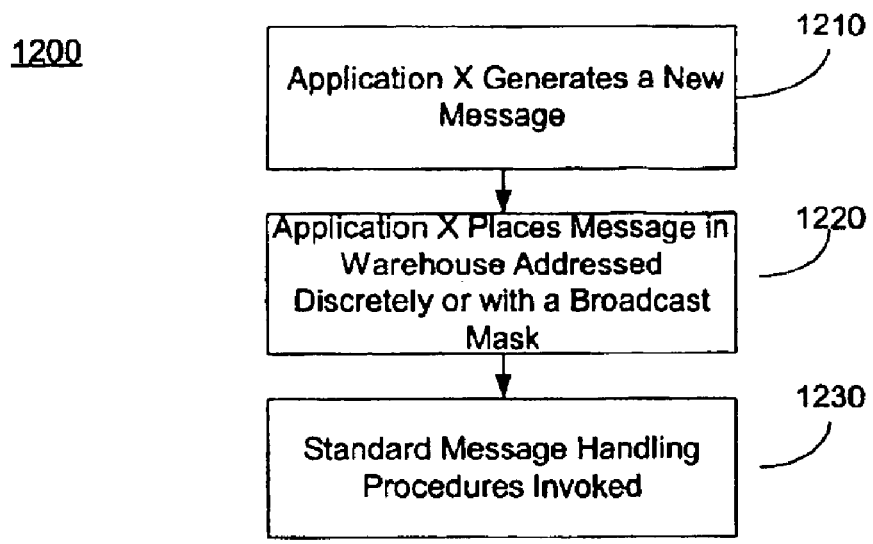
FIG. 12 shows a flow diagram for relaying a message from Application X.

Turning now to FIG. 12, FIG. 12 shows a flow diagram for relaying a message from Application X 1200. Application X generates a new message for dispersal 1210. Encrypting is optional; signing is mandatory. Application X places the message in the Message Warehouse addressed discretely or with a broadcast mask 1220. Standard message handling ensues 1230.

Figure 13:
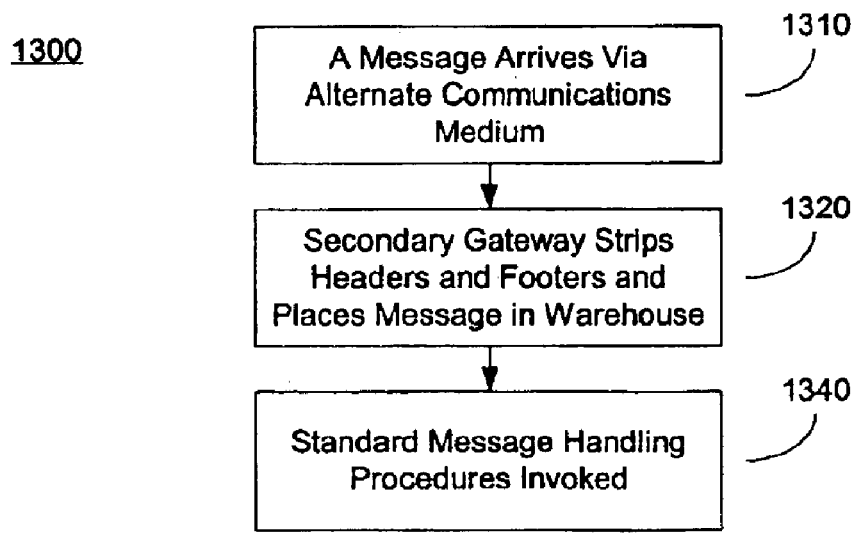
FIG. 13 shows a flow diagram for processing an incoming message distributed via alternate communications.

Turning now to FIG. 13, FIG. 13 shows a flow diagram for processing an incoming message distributed via alternate communications 1300. A message arrives via the Alternate Communications Medium 1310. The Secondary Communications Gateway strips extraneous headers and footers and places the standard message object in the Message Warehouse 1320. Standard message handling ensues 1340.

Figure 14:
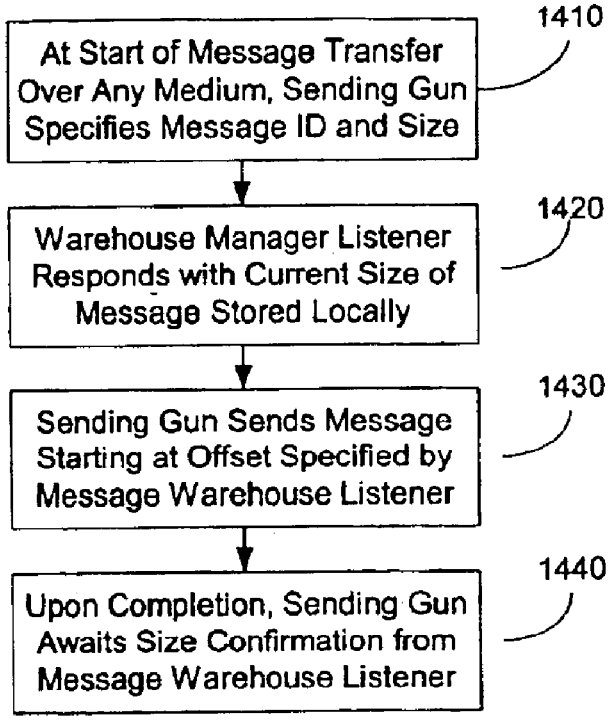
FIG. 14 shows a flow diagram for processing an incoming message.

Turning now to FIG. 14, FIG. 14 shows a flow diagram for processing an incoming message 1400. At the start of a message transfer over any medium, the sending Gun specifies the Message ID and size of the message to be sent 1410. The Message Warehouse Listener responds with the current size of the message stored locally (or 0 if the Message ID does not match any messages in the Warehouse) 1420. The sending Gun sends the message starting from the offset specified by the Message Warehouse Listener 1430. Upon completion, the sending Gun awaits a size confirmation from the receiving Message Warehouse Listener before deleting the message from the source 1440.

Figure 15:
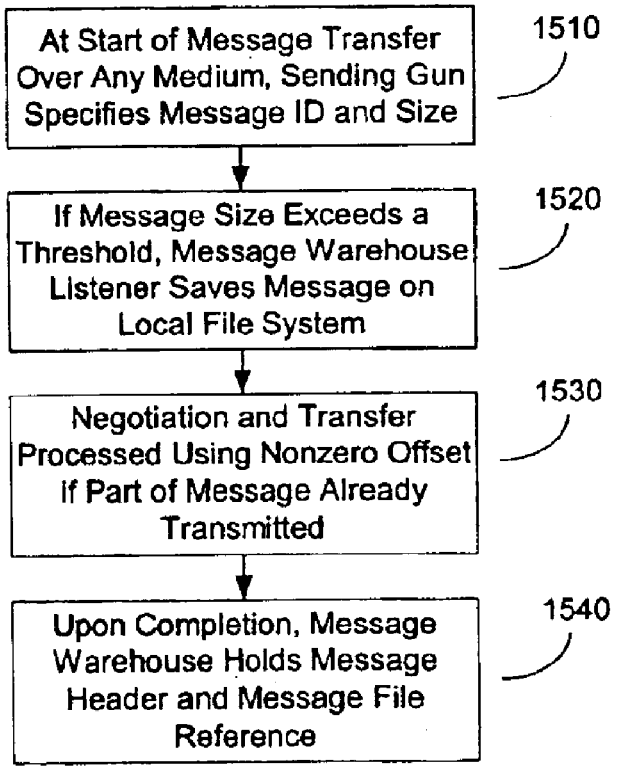
FIG. 15 shows a flow diagram for processing a large incoming message.

Turning now to FIG. 15, FIG. 15 shows a flow diagram for processing a large incoming message 1500. At the start of a message transfer over any medium, the sending Gun specifies the Message ID and size of the message to be sent 1510. If the message size exceeds a configurable threshold, the Message Warehouse Listener makes arrangements to save the incoming message to the local file system rather than keep it in memory 1520. The typical negotiation and transfer occur, using an appropriate non-zero offset if part of the message had already been transmitted 1530. Upon completion, the Message Warehouse holds the message header and a reference to the message file on the system, instead of keeping the full message in memory 1540. Only messages that exceed the threshold are stored to the file system, and only messages stored on the file system may use the Recoverable Data Exchange (RDX) feature. Small messages are retransmitted from scratch if communications fail in the process of transmission.

The network security system of the present invention recognizes three types of subscriptions: Volatile, Permanent, and Fallback. Volatile subscriptions are made by RVPs to other RVPs to specify temporary interest in an addressee or mask. They expire regularly and can be extended by simply requesting a new subscription. Permanent subscriptions are used by connecting SNTL nodes and XMGs, and can only be removed by a configuration change, or by the requester. Fallback subscriptions specify alternative media for communication. If available, the network security system is always the primary communications channel. When the security system fails or is unavailable, the node should automatically reconfigure itself to use the Fallback communications options. This auto-configuration is done in reaction to message expirations on the out-going queues. Table 5 shows how the system reacts to expiration of messages for each subscription type.

TABLE 5

| SUBSCRIPTION TYPE | ON EXPIRATION |
| --- | --- |
| Volatile | Delete subscription |
| Permanent | Do nothing |
| Fallback | Rotate subscription in priority list |

Subscriptions work on a first hit basis. Security network subscriptions are always handled first, and are handled in order from most specific to most generic. When a message expires on an outgoing queue, the subscription that got it to the outgoing queue gets removed. As security network communications avenues become blocked, permanent subscriptions from Relay Nodes get removed automatically. XMGs, the only other source of permanent subscriptions, are not designed to use or ever need Fallback communications media for outgoing messages. So as communications degrade (or if they were never available to begin with), the Fallback subscriptions become the only alternative. If a message expires on an outgoing queue of one of these alternative media, the order gets adjusted to put the most recently failed media at the bottom of the priority list. The original sequence order is created at installation and can be altered by the node's KA (provided it has some way to receive messagesâ even floppy or CDs can inject messages into the Message Warehouse).

Each security system message has a defined lifetime to keep it from going through the above iterations indefinitely. Since the security network is considered to be a "semi-reliable" communications architecture, dropping the expired message is acceptable. However, if this happens too many times, "Disaster Notification" messages need to be generated and made available. The only avenue for doing this may be a floppy disk or the local hard drive. Even so, the node should pursue all options for getting the Disaster Notification off box, or at least recorded on-box.

The following descriptions depict how messages external to an SNTL are implemented between nodes of a network. A first step is to establish a SNTL node on a network by initializing it on the security network.

Figure 16:
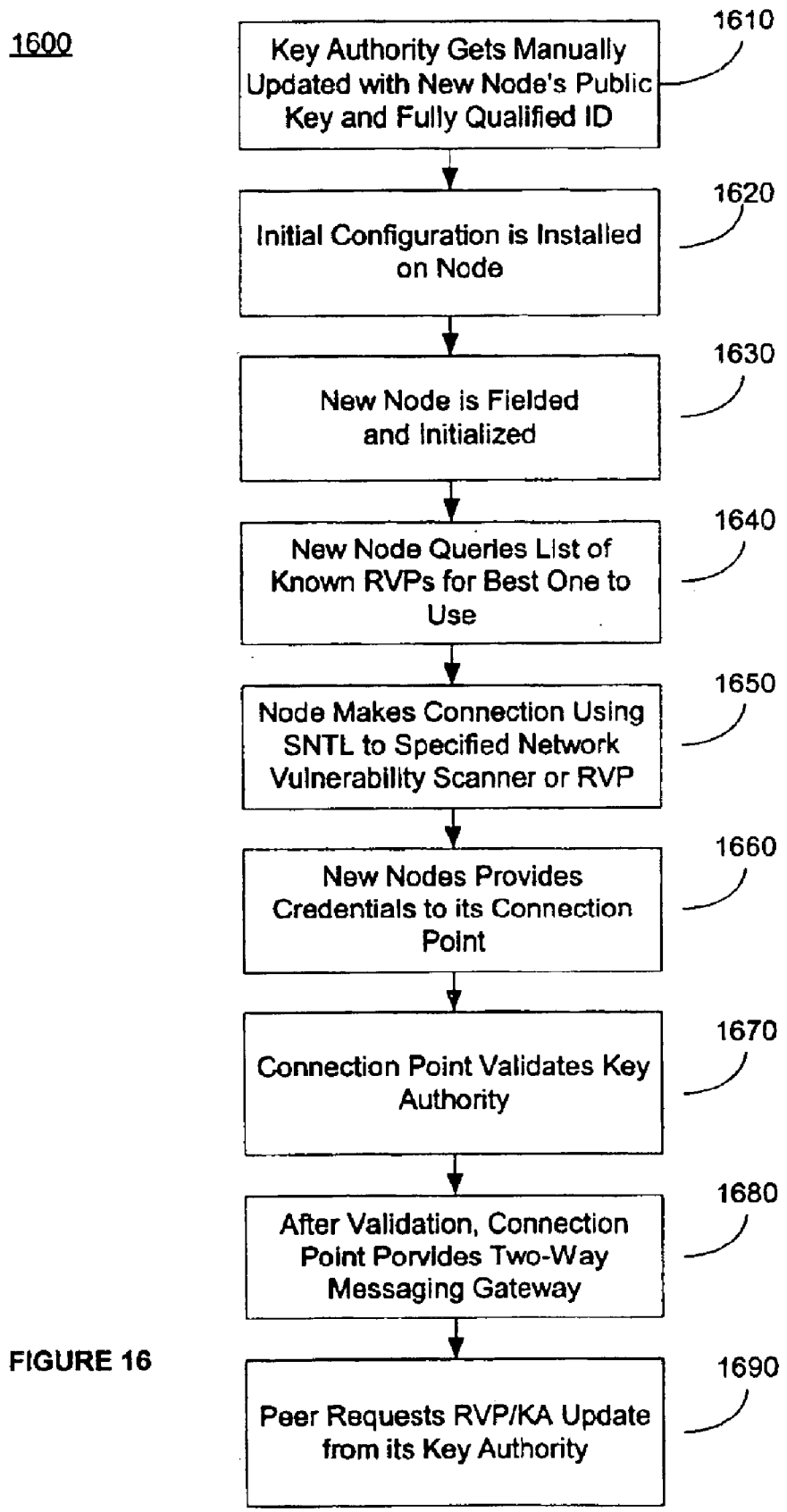
FIG. 16 shows a flow diagram for setting up an Open Pull Protocol (OPP) connection on a security network according to the present invention.

Turning now to FIG. 16, FIG. 16 shows a flow diagram for setting up an Open Pull Protocol (OPP) connection on a security network according to the present invention. A KA gets manually updated with node's Public Key and fully qualified ID 1610. Initial configuration gets installed on the node 1620, including a fully qualified Unique Routing ID (URI), a Public Key of the node, Private Key of the node, a KA specification, the Public Key of the KA, a back-up Public Key of the KA, an upline network vulnerability scanner to connect to (if any), a list of known RVPs, and a list of subscriptions. The node gets fielded and started/booted 1630. The node queries a list of known RVPs for best one to use 1640. The node makes a connection using an SNTL to the specified upline network vulnerability scanner or to the selected RVP 1650. The node provides credentials to its connection point 1660, including a Unique Routing ID, the Digital Signature of node, the KA of the node, and a subscription list. The Digital Signature is computed using the node's Private Key. The connection point validates KA 1670, whereby the node's KA is the same as the connection point's KA, or the KA is in a cached KA list on the connection point, or the connection point sends inquiry to its own KA to validate, saves positive responses in cache. After validation, connection point provides a 2-way messaging gateway 1680, for accepting messages from the node for insertion in the internal Message Warehouse, adding new subscription requests to the contact point's subscription list, and mapping the node's desired subscriptions to the appropriate system resource (for pushing of desired messages from the Message Warehouse back to the node). Subsequently, the peer requests an RVP/KA update from its KA 1690.

Considering the process of setting up a persistent tunnel (KA to each RVP), the KA makes a POPP connection to the RVP with the following exceptions: no query for the best list of RVPs (a connection is made to all), and the RVP always has its KA in cache. The KA sends a list of known RVPs and XMGs to the RVP.

Turning back to FIG. 2, consider the process of deploying a new KA such as world.usa.tg.var1.biginc.KA4, designated 248. KA3, designated 246, is used to generate two new Public-Private Key pairs and associate them with KA4 248, one for primary use and the second as an offline back up. On committal, KA3 246 notifies all known KAs about KA4's introduction to the network. The introduction includes KA4's Public Key and URI. When KA3 246 learns about a new KA from someone else, it passes on introduction information about KA4 248 to that new KA. KA4 248 gets installed/booted and makes a persistent tunnel connection to all of its RVPs, or to a random RVP in the security network (list provided by parent KA).

Turning again to FIG. 2, consider deploying a new RVP, RVP3 258. KA3 246 is used to establish the new RVP3 258 by supplying a URI, an IP address, and the RVP(s) it should use as an XMG, if any. On committal, KA3 246 notifies all known KAs about RVP3's introduction to the network, including the IP address and URI, and when KA3 246 learns about a new KA from someone else, it passes on introduction information about RVP3 258 to that new KA. KA3 246 incessantly attempts connection to RVP3 258 at the specified address.

In FIG. 2, consider deploying an RVP in a Distant Geographic Region as RVP7 250. KA2 240, originally configured to communication through a USA-based RVP, is used to establish the new RVP, by providing a URI, an IP address, and a specification to use RVP1 254 as an XMG. On committal, KA2 240 notifies all known KAs about RVP7's introduction to the network, including IP address and URI, and when KA2 240 learns about a new KA from someone else, it passes on introduction information about RVP7 250 to that new KA. KA1 244 is used to change RVP1 254 configuration to use RVP7 250 as an XMG for "world.euro.*". On committal of configuration change, KA1 244 pushes update to RVP1 254. RVP7 250 now has a permanent subscription on RVP1 254 for "world.euro.*", and RVP1 254 has a permanent subscription on RVP7 250 for "world.usa.*". Intercontinental messages between Europe and the USA will now be stored and forwarded by these two nodes.

Considering FIG. 2 and sending the message:

M S G :
world.usa.tg.var1.smallinc.TB201→world.usa.tg.MC1

MC1 270 makes a Persistent OPP (POPP) connection to RVP3 258. Among list of subscriptions is a request to receive "world.usa.tg.MC1" and related messages. TB201 226 makes a POPP connection to RVP5 260. TB201 226 sends a message to RVP5 260 for KA4 248, asking for Public Key of MC1 270. RVP5 260 forwards the message on to KA4 248. Not having MC1's Public Key, KA4 248 sends an inquiry to all known KAs. KA3 246 receives the inquiry, looks up MC1 270 in its own knowledge base and returns it to KA4 248. KA4 248 returns MC1's Public Key to TB201 226. TB201 226 caches MC1's Public Key upon receipt. The previous steps are no longer required for future message processing. TB201 226 generates an encrypted/signed message for MC1 270 and places it in its internal Message Warehouse. The message propagates through the security network from TB201 226, through RVP5 260, through RVP3 258, and on to MC1 270. MC1 270 receives the message and places it in its Message Warehouse. The appropriate process within MC1 270 pulls the incoming message and processes it.

Considering FIG. 2 and the process of sending a message from TB122 222 to MC1 270:

MSG: world.usa.tg.var1.lil_inc.TB122→world.usa.tg.MC1

TB121 224 makes POPP connection to RVP6 252. MC1 270 makes POPP connection to RVP3 258. TB122 222 makes POPP connection to TB121 224. Having already requested and exchanged Public Keys with MC1 270, TB122 222 encrypts and sends the message to MC1 270 via TB121 224. TB121 224 forwards the message to RVP6 252, which broadcasts the messages availability to other RVPs. The message gets transmitted from RVP6 252 to RVP3 258, and finally on to MC1 270.

Considering FIG. 2 and the process of sending a message from TB334 220 to MC1 270:

M S G :
world.euro.tg.var2.foreigncorp.TB334→world.usa.tg.MC1

KA2 240 registers RVP1 254 as RVP7's XMG for world.usa.* destined messages. KA1 244 registers RVP7 250 as RVP1's XMG for world.euro.* destined messages. Someone uses KA3 246 to manually grant TB334 220 access to MC1 270. KA3 246 discovers, through inquiry, that KA2 240 is the KA for TB334 220. KA3 246 sends MC1's Public Key to KA2 240, and requests TB334's Public Key in return. Nothing more needs to be done if the KA2 administrator enables "Auto Reciprocate". Without this feature turned on, the administrator must explicitly allow TB334's Public Key to be released. Auto Reciprocate means the KA will automatically release a Public Key upon request from another KA. With the proper permissions granted, KA2 240 has the Public Key for MC1 270, and KA1 244. TB334 220 makes a POPP connection to RVP7 250. TB334 220 sends a message to RVP7 250 for KA2 240, asking for Public Key of MC1 270. RVP7 250 forwards the message on to KA2 240. KA2 240 responds to TB334 220 with the requested key. TB334 220 encrypts and sends the message to RVP7 250. RVP7 250 receives the message addressed to world.usa.tg.MC1 270. RVP7 250 sends messages destined for world.usa.* to RVP1 254 because of the permanent subscription installed by KA2 240. RVP1 254 sends an inquiry about the world.usa.tg.MC1 message to all RVPs. RVP3 258 responds, receives the message, and forwards it on to MC1 270.

Considering Auto Reciprocate, Auto Reciprocate is a feature that enables/disables the automatic exchange of Public Keys. For example, in the case of Bob wanting to talk to Pierre, Bob's KA can give Pierre's KA Bob's Public Key, but Pierre's KA can refuse to give up Pierre's Public Key until manually told to do so. Furthermore, once Pierre's Public Key has been given up to (effectively) the world, Auto Reciprocate can be further utilized to control whose Public Key Pierre can accept. So, if Kiera ends up with Pierre's Public Key (somehow), Kiera's KA can send Kiera's Public Key to Pierre's KA, and do message encryption using the two keys, but Pierre's KA can refuse to send Kiera's Public Key to Pierre until someone manually approves the step. This keeps Pierre from communicating with Kiera without expressed authorization.

Figure 17:
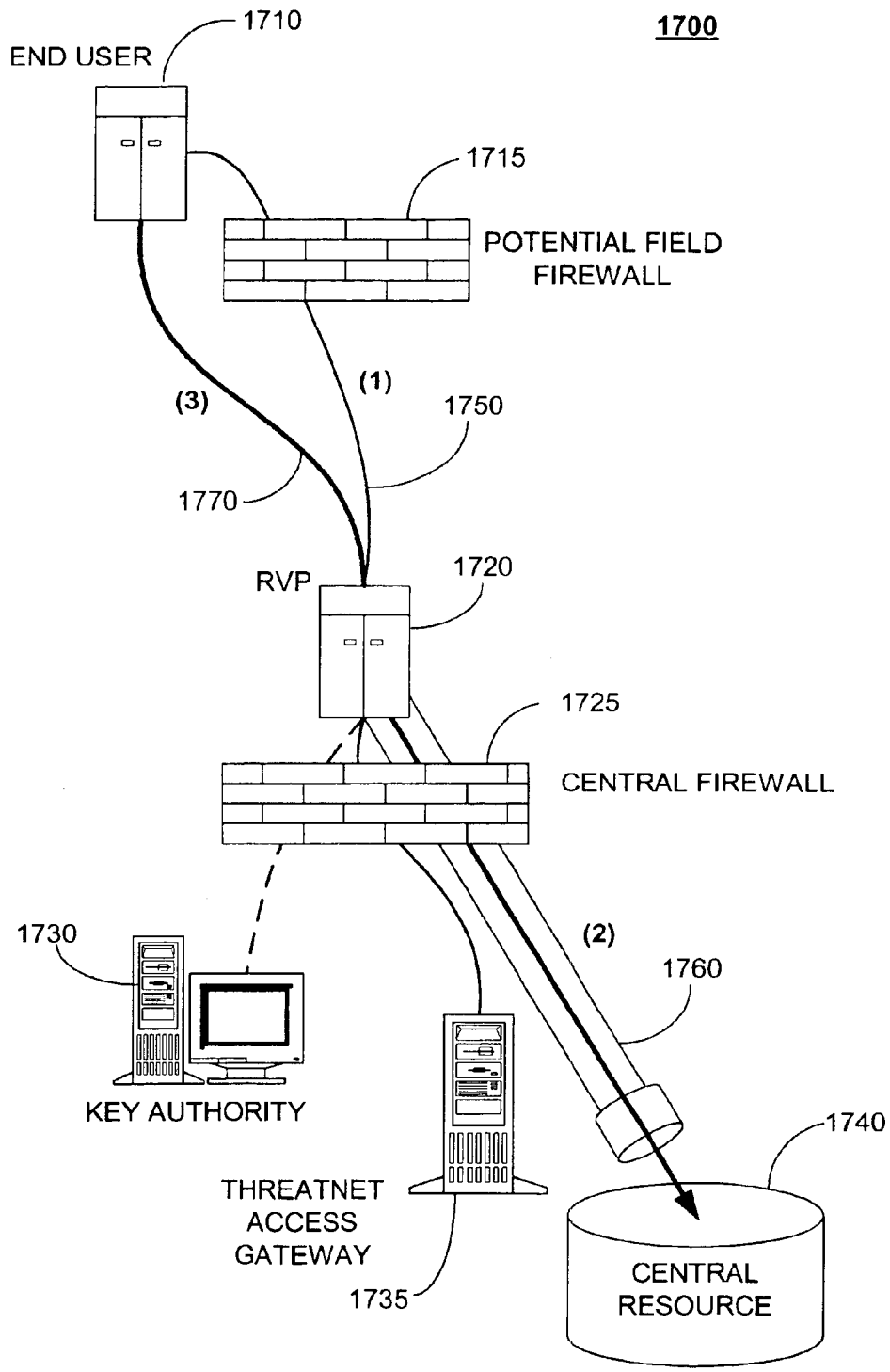
FIG. 17 shows a flow diagram for setting up a Secure Channel (SVC).

Turning to FIG. 17, FIG. 17 shows a flow diagram for setting up a Secure Channel (SVC). An end user 1710 is connected to a RVP 1720, whereby the connection may include a potential firewall 1715. A KA 1730, Secure Access Gateway 1735 and a central resource 1740, such as a database, are connected through a central firewall 1725 to the RVP 1720. Referring to connection (1) 1750, the messaging system negotiates with the Secure Access Gateway 1735 for a secure connection. This process involves sending a message along the security network. When the SAG 1735 fields this request, the end-users 1710 signature is simultaneously given to the SAG 1735. A dedicated Secure Channel (2) 1760 is opened only for the requestor 1710. Using the same signature used for making connection (1) 1750, the Secure Channel process, running on the RVP 1720, checks each connector against the expected signature. These steps ensure that only the intended user is accessing the system. Connection (3) 1770 provides the desired application connection to the local Secure Channel endpoint 1710 to connect to the target resource 1740. Once the tunnel has been fully consummated throughout, the end user application 1710 can access the desired resource 1740, over the secure network by connecting to a specified local port.

Considering FIG. 2 and the process of sending a message via a Secure Channel from Kiera 214 to TAG1 280:

SVC: world.usa.tg.var1.smallinc.users.kiera→world.usa.axess.corp.TAG1

KA5 242 is used to explicitly grant access to TAG1 280 to Kiera 214 for Application X. TAG1 280 makes a POPP connection to RVP2 256. Kiera 214 makes an OPP connection to TB201 226 or any RVP. Kiera 214 sends connection request for TAG1 280 to KA5 242, including URI, Password, digital signature, and the hash of the application she wants to use to connect to the TAG resource. KA5 242 verifies password & signature, where the hash is used as a signature to validate the transmission. KA5 242 sends message to TAG1 280 to open a listener for Kiera 214 with a decryption key based on Kiera's Public Key. KA5 242 sends a message to RVP2 256 to open an ephemeral port on RVP2 256 as a tunneled port to TAG1 280. This directive includes instructions to set access controls on the newly-opened port such that only Kiera 214 can access it. RVP2 256 returns confirmation of open port to KA5 242, including the port number that was opened for Kiera 214. KA5 242 sends Kiera 214 notification of the forwarded service offering, including the IP address, port number opened by RVP2 256, and single-use authentication token. Kiera 214 starts an internal listener on the loop back interface that encrypts all traffic with the appropriate Private Key. This hash is calculated for the application that connects to the loop back listener. Kiera 214, having pre-configured the network-aware application to use the loop back interface, starts up the application. The application connects to the loop back interface: the application's hash is rechecked, on a successful hash check, the forwarded connection to RVP2 256 is completed, the internal listener encrypts all traffic with TAG1's Public Key, where the hash is used as a signature to validate the transmission, and TAG1 280 decrypts the traffic with the appropriate Private Key. The application traffic gets encrypted as it passes through the loop back listener, forwarded to the RVP2 ephemeral port, and forwarded to TAG1 280 where it is decrypted and passed on to the target resource. On initial connection, Kiera's loop back listener and TAG1 280 negotiate a session key after verifying proper public/Private Keys and application hash. This session key is used for continued communication over the channel.

Considering FIG. 2 and the process of sending a message from Pierre 210 to Bob 216:

MSG: world.euro.tg.var2.foreigncorp.users.pierre→world.usa.tg.var.1.biginc.users.bob KA4 248 explicitly grants access to Bob 216 from Pierre 210, including full exchange of Public Keys. Bob 216 makes an OPP connection to TB26 230, or any RVP. Assuming Bob 216 chose TB26 230, TB26 230 now has a connecting member interested in "world.usa.tg.var1.biginc.users.bob" messages. TB26 230 subscribes to "â□bob" messages on RVP4 248. Pierre 210 makes an OPP connection to TB334 220, or any RVP. Pierre 210 requests and receives Bob's Public Key. Pierre 210 encrypts and sends a message via RVP7 250 destined for "world.usa.â□bob". Due to RVP1's permanent subscription to "world.usa.*" on RVP7 250, RVP7 250 sends the message to RVP1 254. Upon receipt, RVP1 254 asks all world.usa RVPs if they're interested in the "â□bob" message. RVP4 262 responds and takes receipt of the message. RVP4262 forwards the message to TB26 230. TB26 230 forwards the message to Bob 216.

Considering FIG. 2 and the process of sending a message via a Secure Channel from Pierre 210 to Bob 216:

SVC: world.euro.tg.var2.foreigncorp.users.pierre→world.usa.tg.var.1.biginc.users.bob KA4 248 is used to allow Bob 216 to accept messages from Pierre 210. Assuming KA2 240 does not have Auto Reciprocate enabled, the KA2 240 administrator receives notice that Bob 216 is requesting Pierre's Public Key. The KA2 administrator approves, and Pierre's Public Key is passed back to KA4 248. Bob 216 makes a POPP connection to TB26 230. Bob 216 makes a service-offering request. Bob's POPP connection to TB26 230 is terminated in favor of a POPP connection to RVP4 262. Pierre 210 makes a POPP connection to TB334 220. Pierre 210 retrieves Bob's Public Key from KA2 240 and caches it. Pierre 210 sends a connection request for Bob 216 to KA4 248. KA4 248 verifies credentials of Pierre 210, including hash of requested application, Application Z. KA4 248 sends a message to Bob 216 to open a listener for Pierre 210 with a decryption key based on Pierre's Public Key. The hash of Application Z is used as a signature to validate the transmission.

Considering FIG. 2 and the process of sending a message from KA1 244 to RVP1 254:

MSG: world.usa.KA1→world.usa.RVP1

KA1 244 makes a persistent connection to RVP1 254 using a secure tunnel. A keep alive revitalize process running on KA1 244 and interacting with its counterpart on RVP1 254 makes sure the connection stays alive across firewalls, and that the connection is automatically re-instated if it drops for any reason. A process on KA1 244 generates a message addressed for RVP1 254 and places it in KA1's Message Warehouse. Normal message handling progresses the message to RVP1's Message Warehouse. The appropriate process on RVP1 254 pulls and processes the message.

Considering FIG. 2 and the process of sending a message from RVP5 260 to KA4 248:

MSG: world.usa.tg.var.1.biginc.RVP5→world.usa.tg.var.1.biginc.KA4

KA4 248 makes a persistent connection to RVP5 260 using a secure tunnel. A keep alive revitalize process running on KA4 248 and interacting with its counterpart on RVP1 254 makes sure the connection stays alive across firewalls, and that the connection is automatically re-instated if it drops for any reason. A process on RVP5 260 generates a message-addressed for KA4 248 and places it in RVP5's Message Warehouse. Normal message handling progresses the message to KA4's Message Warehouse. The appropriate process on KA4 248 pulls and processes the message.

Considering FIG. 2 and the process of sending a message from KA1 244 to KA2 240:

MSG: world.usa.KA1→world.euro.KA2

KA1 244 makes a persistent connection to RVP1 254 using a secure tunnel. KA2 240 makes a persistent connection to RVP7 250 using a secure tunnel. KA2 240 configures RVP7 250 to request a permanent subscription for "world.euro.*" messages on RVP1 254. KA1 244 generates a message addressed to "world.euro.KA2", encrypted with KA2's Public Key, and signed with its own Private Key. KA1 244 places the message in its Message Warehouse. Normal message handling progresses the message from KA1 244 through RVP1 254, through RVP7 250, and on to KA2 240. The appropriate process on KA2 240 pulls and processes the message.

Although the present invention has been described in detail with reference to certain preferred embodiments, it should be apparent that modifications and adaptations to those embodiments might occur to persons skilled in the art without departing from the spirit and scope of the present invention.

What is claimed is:

1. A method for secure message-oriented communications between nodes in a network, comprising the steps of:

deploying at least one key authority within the network;

deploying a plurality of rendezvous peers in the network having a plurality of nodes and associating a group of the plurality of network nodes with each rendezvous peer;

validating connecting rights of each rendezvous peer and the network nodes by the at least one key authority using public-private key pairs, uniform resource identifiers, IP addresses and lists of rendezvous peers stored within the at least one key authority;

controlling network node access to the network by each rendezvous peer associated with a controlled group of network nodes;

establishing an open pull protocol connection between each requesting node of the network and a single rendezvous peer by providing the at least one key authority of each requesting node for validation of connection rights; and exchanging secure message-oriented communications between the validated nodes of the network via message channels on the rendezvous peers using public key infrastructure techniques facilitated by the at least one key authority.

2. The method of claim 1, wherein the step of deploying at least one key authority comprises:

generating a set of public-private key pairs and a uniform resource identifier;

associating the generated public-private key pair and uniform resource identifier with the at least one key authority;

notifying all other known key authorities in the network about the network introduction of the at least one key authority, including the associated public-private key pair and the uniform resource identifier; and initializing the at least one key authority and making a persistent tunnel connection to all rendezvous peers in the network from the at least one key authority.

3. The method of claim 2, wherein the step of generating and associating the public-private key is performed manually by a user.

4. The method of claim 2, wherein the step of generating and associating the public-private key is performed automatically by another existing key authority.

5. The method of claim 2, further comprising enabling an automatic exchange of public keys using an auto reciprocate feature.

6. The method of claim 2, wherein a persistent tunnel connection requested by a public network user node is established by a key authority and a secure access gateway on the protected side of a firewall.

7. The method of claim 2, wherein the key authorities limit user access to approved applications.

8. The method of claim 1, wherein the step of deploying a plurality of rendezvous peers in the network comprises:

for each deploying rendezvous peer, generating and associating a uniform resource identifier, an IP address, and a list of other rendezvous peers to be used a cross-geographic message gateways, by a nearest key authority in the network;

notifying all known key authorities in the network about the network introduction of the each deploying rendezvous peer, including the associated IP address and the uniform resource identifier; and initializing each deploying rendezvous peer and making a persistent tunnel connection between each rendezvous peer and a nearest key authority in the network.

9. The method of claim 1, wherein the step of establishing an open pull protocol connection between each node of the network and a single rendezvous peer comprises:

manually updating a key authority with each associated node public key and fully qualified identification;

installing an initial configuration on each node including credentials of a fully qualified uniform resource identifier, a public key, a private key, an associated key authority identification, the public key of the associated key authority, an associated upline network vulnerability scanner, a list of known rendezvous peers, and a list of subscriptions;

initializing each node of the network;

determining a best rendezvous peer to associate with each node from a list of known rendezvous peers;

making a connection between each node and the associated best rendezvous peer and upline network vulnerability scanner;

providing credentials of each node to its associated rendezvous peer;

validating a key authority associated with each node, whereby the key authority associated with each node is the same as that of the node's associated rendezvous peer;

providing a two way messaging gateway by the associated rendezvous peer of each node; and requesting an update by each rendezvous peer from its associated key authority.

10. The method of claim 1, wherein the step of exchanging messages between the nodes of the network comprises:

granting access to a first user from a second user by the first user associated key authority;

making an open pull protocol connection by the first user to the first user associated rendezvous peer;

making an open pull protocol connection by the second user to the second user associated rendezvous peer;

requesting and receiving the first user public key by the second user;

encrypting and sending a message by the second to the first user via the second user associated rendezvous peer;

receiving the message by the first user associated rendezvous peer; and forwarding the message to the first user by the first user associated rendezvous peer.

11. The method of claim 1, wherein the step of exchanging messages between the nodes of the network further includes exchanging messages via a secure channel, the exchanging step comprising:

making a open pull protocol connection to a first user associated rendezvous peer by a first user;

sending a connection request for a second user to a second user associated key authority by the first user;

verifying the credentials of the first user by the second user associated key authority;

sending a message to a second user by the second user associated key authority to open a listener for the first user with first user's public key;

sending a message to a second user associated rendezvous peer to open a tunneled port to the second user;

confirming an open tunneled port to the second user associated key authority;

sending notification of a forwarded service offering to first user, including IP address port number opened, and authentication token;

starting an internal listener on a loop back interface and a user application by the first user;

connecting the user application to the second user associated rendezvous peer; and transferring encrypted network traffic through the established secure channel between the first user application and the second user.

12. The method of claim 1, wherein the step of exchanging messages between the nodes of the network is selected from the group consisting of exchanging messages between a node and users, exchanging messages between a node and network scanners, exchanging messages between a node and rendezvous clients, exchanging messages between a node and key authorities, exchanging messages between a node and access gateways, and exchanging messages between a node and message consolidators.

13. The method of claim 1, wherein the step of exchanging messages between the nodes of the network is selected from the group consisting of exchanging messages over a non-secure message channel and exchanging messages over a secure message channel.

14. The method of claim 1, further comprising establishing subscriptions for specifying how matching messages are transported to requesting network nodes.

15. The method of claim 14, wherein each subscription is selected from the group consisting of volatile subscriptions, permanent subscriptions, and fallback subscriptions.

16. A computer-readable medium containing instructions for controlling a network to implement the method of claim 1.

17. A system for secure message-oriented communications between nodes in a network, comprising:
  means for deploying at least one key authority within the network;
  means for deploying a plurality of rendezvous peers in the network having a plurality of nodes and associating a group of the plurality of network nodes with each rendezvous peer;
  means for validating connecting rights of each rendezvous peer and the network nodes by the at least one key authority using public-private key pairs, uniform resource identifiers, IP addresses and lists of rendezvous peers stored within the at least one key authority;
  means for controlling network node access to the network by each rendezvous peer associated with a controlled group of network nodes;
  means for establishing an open pull protocol connection between each requesting node of the network and a single rendezvous peer by providing the at least one key authority of each reciuesting node for validation of connection rights; and
  means for exchanging secure message-oriented communications between the validated nodes of the network via message channels on the rendezvous peers using public key infrastructure techniques facilitated by the at least one key authority.

18. The system of claim 17, wherein the means for establishing an open pull protocol connection and the means for exchanging secure message-oriented communications between the nodes comprises a security network transport layer comprising a Message Warehouse Listener, Message Warehouse, Message Warehouse Manager, Subscription Manager, Subscription Cache, Relay Queue, Relay Gun, Router Daemon, Routing Queue, RVP Gun, Signature Checker, Cryptor, RVP Cache, RVP Cache Manager, Public Key storage, Key Manager, and one or more Secondary Communications Gateways.

19. The system of claim 17, wherein each node in the network includes a security network transport layer for establishing an open pull protocol connection and exchanging messages between the nodes.

20. The system of claim 17, wherein each network node is selected from the group consisting of a user, a network vulnerability scanner, a rendezvous peer, a security access gateway, a threat receiver, a master consolidator, and a key authority.

21. The system of claim 17 wherein the network includes firewalls and cross-geographic gateways.

22. A method for secure message-oriented communications between nodes in a network, comprising the steps of:
  establishing a publish-subscribe network of peer nodes;
  communicating between peer nodes using key authorities as validation instruments;
  securely connecting all nodes of the network using open pull protocol connections to connect each node of the network to a message channel on a single rendezvous peer;
  providing a key authority of a requestor node for validation of connection rights; and
  when validated, enabling secure secure message-oriented communications between a node and all other validated nodes of the network via message channel on the rendezvous peer, provided public keys are properly exchanged.

23. The method of claim 22, wherein the key authorities automatically facilitate exchange of public keys.

24. The method of claim 22, wherein the connected nodes subscribe to channels on a rendezvous peer.

25. The method of claim 22, wherein all messages are passed by either a discrete or broadcast channel.

26. The method of claim 22, further comprising security access gateways for limiting access to predetermined applications.

27. The method of claim 22, wherein each message includes a signature of a sender and each message header includes a field for designating a message originator.

28. The method of claim 27, wherein the signature must match the public key of the sender for validation.

* * * * *